United States Patent [19]

Blitz et al.

[11] Patent Number: 5,535,399
[45] Date of Patent: Jul. 9, 1996

[54] SOLID STATE DISK DRIVE UNIT HAVING ON-BOARD BACKUP NON-VOLATILE MEMORY

[75] Inventors: Martin C. Blitz, Worcester; James C. Stegeman; Peter B. Bareham, both of Acton, all of Mass.

[73] Assignee: Quantum Corporation, Milpitas, Calif.

[21] Appl. No.: 130,047

[22] Filed: Sep. 30, 1993

[51] Int. Cl.[6] .................................................. G06F 12/00
[52] U.S. Cl. .................... 395/750; 395/182.04; 395/471; 395/431
[58] Field of Search ...................................... 395/400, 425

[56] References Cited

U.S. PATENT DOCUMENTS

| | | | |
|---|---|---|---|
| 4,394,732 | 7/1983 | Swenson | 395/425 |
| 4,506,323 | 3/1985 | Pusic et al. | 395/425 |
| 4,811,203 | 3/1989 | Hamstra | 395/425 |
| 5,034,915 | 7/1991 | Sturna et al. | 395/425 |
| 5,197,026 | 3/1993 | Butler | 365/104 |
| 5,379,415 | 1/1995 | Papenberg et al. | 395/575 |
| 5,396,637 | 3/1995 | Harwell et al. | 395/750 |
| 5,418,925 | 5/1995 | DeMoss et al. | 395/425 |

OTHER PUBLICATIONS

Amaru, Christopher, "Solid-state SCSI—affordable luxury." Digital Review, v. 9, N. 13 p. 27(2), Jul. 13, 1992.
Chen, Peter M. et al, "Storage Performance—Metrics and Benchmarks." Proc. of the IEEE, Aug. 1993, v. 81, Issue 8, pp. 1151–1165.

Primary Examiner—Rebecca L. Rudolph
Attorney, Agent, or Firm—David B. Harrison

[57] ABSTRACT

Disclosed is a solid state disk drive, including a volatile, electronic RAM, memory and a non volatile, magnetic disk. The drive continuously saves unique data stored in the memory back to the disk. Additionally, the drive includes a number of tables and bit fields, in both volatile electronic memory and disk, for generally keeping track of what data has been restored from disk to memory, what data in the memory has been modified since it was restored from disk, and what modified data in the memory has been saved back to disk. In the event of a primary power outage, the drive first saves the volatile tables onto disk, and then saves the volatile, modified data onto disk, while using auxiliary power. If, however, auxiliary power is lost before any or all of the modified data is saved on disk, the saved tables provide information which enables the drive to distinguish the valid from the invalid data on disk.

27 Claims, 22 Drawing Sheets

DISK 50 (NON-VOLATILE)

| ADDR. | DATA | DISK TAGS |
|---|---|---|
| 0 | DATA | * |
| 1 | DATA | * |
| 2 | DATA | * |
| 3 | DATA | * |
| 4 | DATA | * |
| 5 | DATA | * |
| 6 | DATA | * |
| ... | ... | ... |
| (N-2) | DATA | * |
| (N-1) | DATA | * |

MEMORY ARRAY 32 (VOLITILE)

| ADDR. | DATA |
|---|---|
| 0 | * |
| 1 | * |
| 2 | * |
| 3 | * |
| 4 | * |
| 5 | * |
| 6 | * |
| ... | ... |
| (N-2) | * |
| (N-1) | * |

FIG. 2A (AT T1)

DISK 50 (NON-VOLATILE)

| ADDR. | SBT nv 52 | SBT nv 54 | TAG 60 | TBL. VAL. 62 |
|---|---|---|---|---|
| 0 | * | * | * | * |
| 1 | * | * | | |
| 2 | * | * | | |
| 3 | * | * | | |
| 4 | * | * | | |
| 5 | * | * | | |
| 6 | * | * | | |
| ... | ... | ... | | |
| (N-2) | * | * | | |
| (N-1) | * | * | | |
| CNTR | * | * | | |

90  92

TABLES MEMORY 34 (VOLITILE)

| ADDR. | AVT 40 | DVT 42 | SBT$_V$ 44 |
|---|---|---|---|
| 0 | * | * | * |
| 1 | * | * | * |
| 2 | * | * | * |
| 3 | * | * | * |
| 4 | * | * | * |
| 5 | * | * | * |
| 6 | * | * | * |
| ... | ... | ... | ... |
| (N-2) | * | * | * |
| (N-1) | * | * | * |

FIG. 3A (AT T1)

DISK 50 (NON-VOLATILE)

| ADDR. | DATA | DISK TAGS |
|---|---|---|
| 0 | DATA | 1 |
| 1 | DATA | 1 |
| 2 | DATA | 1 |
| 3 | DATA | 1 |
| 4 | DATA | 1 |
| 5 | DATA | 1 |
| 6 | DATA | 1 |
| ... | ... | ... |
| (N-2) | DATA | 1 |
| (N-1) | DATA | 1 |

MEMORY ARRAY 32 (VOLITILE)

| ADDR. | DATA |
|---|---|
| 0 | * |
| 1 | * |
| 2 | * |
| 3 | * |
| 4 | * |
| 5 | * |
| 6 | * |
| ... | ... |
| (N-2) | * |
| (N-1) | * |

FIG. 2B (AT T2)

DISK 50 (NON-VOLATILE)

| ADDR. | SBT nv 52 | SBT nv 54 | TAG 60 | TBL. VAL. 62 |
|---|---|---|---|---|
| 0 | 0 | 0 | 1 | 1 |
| 1 | 0 | 0 | | |
| 2 | 0 | 0 | | |
| 3 | 0 | 0 | | |
| 4 | 0 | 0 | | |
| 5 | 0 | 0 | | |
| 6 | 0 | 0 | | |
| ... | ... | ... | | |
| (N-2) | 0 | 0 | | |
| (N-1) | 0 | 0 | | |
| CNTR | 0 | 1 | | |
| | 90 | 92 | | |

TABLES MEMORY 34 (VOLITILE)

| ADDR. | AVT 40 | DVT 42 | SBT$_V$ 44 |
|---|---|---|---|
| 0 | 0 | 0 | 0 |
| 1 | 0 | 0 | 0 |
| 2 | 0 | 0 | 0 |
| 3 | 0 | 0 | 0 |
| 4 | 0 | 0 | 0 |
| 5 | 0 | 0 | 0 |
| 6 | 0 | 0 | 0 |
| ... | ... | ... | ... |
| (N-2) | 0 | 0 | 0 |
| (N-1) | 0 | 0 | 0 |

FIG. 3B (AT T2)

DISK 50
(NON-VOLATILE)

| ADDR. | DATA | DISK TAGS |
|---|---|---|
| 0 | DATA | 1 |
| 1 | DATA | 1 |
| 2 | DATA | 1 |
| 3 | DATA | 1 |
| 4 | DATA | 1 |
| 5 | DATA | 1 |
| 6 | DATA | 1 |
| ... | ... | ... |
| (N-2) | DATA | 1 |
| (N-1) | DATA | 1 |

MEMORY ARRAY 32
(VOLITILE)

| ADDR. | DATA |
|---|---|
| 0 | DATA |
| 1 | * |
| 2 | * |
| 3 | * |
| 4 | * |
| 5 | * |
| 6 | * |
| ... | ... |
| (N-2) | * |
| (N-1) | * |

FIG. 2C (AT T3)

DISK 50
(NON-VOLATILE)

| ADDR. | SBT nv 52 | SBT nv 54 | TAG 60 | TBL. VAL. 62 |
|---|---|---|---|---|
| 0 | 0 | 0 | 1 | 1 |
| 1 | 0 | 0 | | |
| 2 | 0 | 0 | | |
| 3 | 0 | 0 | | |
| 4 | 0 | 0 | | |
| 5 | 0 | 0 | | |
| 6 | 0 | 0 | | |
| ... | ... | ... | | |
| (N-2) | 0 | 0 | | |
| (N-1) | 0 | 0 | | |
| CNTR | 0 | 1 | | |
|  | 90 | 92 | | |

TABLES MEMORY 34
(VOLITILE)

| ADDR. | AVT 40 | DVT 42 | SBTv 44 |
|---|---|---|---|
| 0 | 1 | 1 | 0 |
| 1 | 0 | 0 | 0 |
| 2 | 0 | 0 | 0 |
| 3 | 0 | 0 | 0 |
| 4 | 0 | 0 | 0 |
| 5 | 0 | 0 | 0 |
| 6 | 0 | 0 | 0 |
| ... | ... | ... | ... |
| (N-2) | 0 | 0 | 0 |
| (N-1) | 0 | 0 | 0 |

FIG. 3C (AT T3)

DISK 50
(NON-VOLATILE)

| ADDR. | DATA | DISK TAGS |
|---|---|---|
| 0 | DATA | 1 |
| 1 | DATA | 1 |
| 2 | DATA | 1 |
| 3 | DATA | 1 |
| 4 | DATA | 1 |
| 5 | DATA | 1 |
| 6 | DATA | 1 |
| ... | ... | ... |
| (N-2) | DATA | 1 |
| (N-1) | DATA | 1 |

MEMORY ARRAY 32
(VOLITILE)

| ADDR. | DATA |
|---|---|
| 0 | DATA |
| 1 | DATA |
| 2 | * |
| 3 | * |
| 4 | * |
| 5 | * |
| 6 | * |
| ... | ... |
| (N-2) | * |
| (N-1) | * |

FIG. 2D (AT T4)

DISK 50
(NON-VOLATILE)

| ADDR. | SBT nv 52 | SBT nv 54 | TAG 60 | TBL. VAL. 62 |
|---|---|---|---|---|
| 0 | 0 | 0 | 1 | 1 |
| 1 | 0 | 0 | | |
| 2 | 0 | 0 | | |
| 3 | 0 | 0 | | |
| 4 | 0 | 0 | | |
| 5 | 0 | 0 | | |
| 6 | 0 | 0 | | |
| ... | ... | ... | | |
| (N-2) | 0 | 0 | | |
| (N-1) | 0 | 0 | | |
| CNTR | 0 | 1 | | |
| | 90 | 92 | | |

TABLES MEMORY 34
(VOLITILE)

| ADDR. | AVT 40 | DVT 42 | SBT$_V$ 44 |
|---|---|---|---|
| 0 | 1 | 1 | 0 |
| 1 | 1 | 1 | 0 |
| 2 | 0 | 0 | 0 |
| 3 | 0 | 0 | 0 |
| 4 | 0 | 0 | 0 |
| 5 | 0 | 0 | 0 |
| 6 | 0 | 0 | 0 |
| ... | ... | ... | ... |
| (N-2) | 0 | 0 | 0 |
| (N-1) | 0 | 0 | 0 |

FIG. 3D (AT T4)

DISK 50 (NON-VOLATILE)

| ADDR. | DATA | DISK TAGS |
|---|---|---|
| 0 | DATA | 1 |
| 1 | DATA | 1 |
| 2 | DATA | 1 |
| 3 | DATA | 1 |
| 4 | DATA | 1 |
| 5 | DATA | 1 |
| 6 | DATA | 1 |
| ... | ... | ... |
| (N-2) | DATA | 1 |
| (N-1) | DATA | 1 |

MEMORY ARRAY 32 (VOLITILE)

| ADDR. | DATA |
|---|---|
| 0 | DATA |
| 1 | DATA |
| 2 | * |
| 3 | DATA |
| 4 | * |
| 5 | * |
| 6 | * |
| ... | ... |
| (N-2) | * |
| (N-1) | * |

FIG. 2E (AT T5)

DISK 50 (NON-VOLATILE)

| ADDR. | SBT nv 52 | SBT nv 54 | TAG 60 | TBL. VAL. 62 |
|---|---|---|---|---|
| 0 | 0 | 0 | 1 | 0 |
| 1 | 0 | 0 | | |
| 2 | 0 | 0 | | |
| 3 | 0 | 0 | | |
| 4 | 0 | 0 | | |
| 5 | 0 | 0 | | |
| 6 | 0 | 0 | | |
| ... | ... | ... | | |
| (N-2) | 0 | 0 | | |
| (N-1) | 0 | 0 | | |
| CNTR | 0 | 1 | | |
| | 90 | 92 | | |

TABLES MEMORY 34 (VOLITILE)

| ADDR. | AVT 40 | DVT 42 | SBTv 44 |
|---|---|---|---|
| 0 | 1 | 1 | 0 |
| 1 | 1 | 1 | 0 |
| 2 | 0 | 0 | 0 |
| 3 | 1 | 1 | 0 |
| 4 | 0 | 0 | 0 |
| 5 | 0 | 0 | 0 |
| 6 | 0 | 0 | 0 |
| ... | ... | ... | ... |
| (N-2) | 0 | 0 | 0 |
| (N-1) | 0 | 0 | 0 |

FIG. 3E (AT T5)

DISK 50 (NON-VOLATILE)

| ADDR. | DATA | DISK TAGS |
|---|---|---|
| 0 | DATA | 1 |
| 1 | DATA | 1 |
| 2 | DATA | 1 |
| 3 | DATA | 1 |
| 4 | DATA | 1 |
| 5 | DATA | 1 |
| 6 | DATA | 1 |
| ... | ... | ... |
| (N−2) | DATA | 1 |
| (N−1) | DATA | 1 |

MEMORY ARRAY 32 (VOLITILE)

| ADDR. | DATA |
|---|---|
| 0 | DATA |
| 1 | DATA |
| 2 | DATA |
| 3 | DATA |
| 4 | * |
| 5 | * |
| 6 | * |
| ... | ... |
| (N−2) | * |
| (N−1) | * |

FIG. 2F (AT T6)

DISK 50 (NON-VOLATILE)

| ADDR. | SBT nv 52 | SBT nv 54 | TAG 60 | TBL. VAL. 62 |
|---|---|---|---|---|
| 0 | 0 | 0 | 1 | 0 |
| 1 | 0 | 0 | | |
| 2 | 0 | 0 | | |
| 3 | 0 | 0 | | |
| 4 | 0 | 0 | | |
| 5 | 0 | 0 | | |
| 6 | 0 | 0 | | |
| ... | ... | ... | | |
| (N−2) | 0 | 0 | | |
| (N−1) | 0 | 0 | | |
| CNTR | 0 | 1 | | |
| | 90 | 92 | | |

TABLES MEMORY 34 (VOLITILE)

| ADDR. | AVT 40 | DVT 42 | SBT$_V$ 44 |
|---|---|---|---|
| 0 | 1 | 1 | 0 |
| 1 | 1 | 1 | 0 |
| 2 | 1 | 1 | 0 |
| 3 | 1 | 1 | 0 |
| 4 | 0 | 0 | 0 |
| 5 | 0 | 0 | 0 |
| 6 | 0 | 0 | 0 |
| ... | ... | ... | ... |
| (N−2) | 0 | 0 | 0 |
| (N−1) | 0 | 0 | 0 |

FIG. 3F (AT T6)

DISK 50
(NON-VOLATILE)

| ADDR. | DATA | DISK TAGS |
|---|---|---|
| 0 | DATA | 1 |
| 1 | DATA | 1 |
| 2 | DATA | 1 |
| 3 | DATA | 1 |
| 4 | DATA | 1 |
| 5 | DATA | 1 |
| 6 | DATA | 1 |
| ... | ... | ... |
| (N−2) | DATA | 1 |
| (N−1) | DATA | 1 |

MEMORY ARRAY 32
(VOLITILE)

| ADDR. | DATA |
|---|---|
| 0 | DATA |
| 1 | DATA |
| 2 | DATA |
| 3 | DATA |
| 4 | DATA |
| 5 | DATA |
| 6 | DATA |
| ... | ... |
| (N−2) | DATA |
| (N−1) | DATA |

FIG. 2G (AT T7)

DISK 50
(NON-VOLATILE)

| ADDR. | SBTnv 52 | SBTnv 54 | TAG 60 | TBL. VAL. 62 |
|---|---|---|---|---|
| 0 | 0 | 0 | 1 | 0 |
| 1 | 0 | 0 | | |
| 2 | 0 | 0 | | |
| 3 | 0 | 0 | | |
| 4 | 0 | 0 | | |
| 5 | 0 | 0 | | |
| 6 | 0 | 0 | | |
| ... | ... | ... | | |
| (N−2) | 0 | 0 | | |
| (N−1) | 0 | 0 | | |
| CNTR | 0 | 0 | | |
| | 90 | 92 | | |

TABLES MEMORY 34
(VOLITILE)

| ADDR. | AVT 40 | DVT 42 | SBT$_V$ 44 |
|---|---|---|---|
| 0 | 1 | 1 | 0 |
| 1 | 1 | 1 | 0 |
| 2 | 1 | 1 | 0 |
| 3 | 1 | 1 | 0 |
| 4 | 1 | 1 | 0 |
| 5 | 1 | 1 | 0 |
| 6 | 1 | 1 | 0 |
| ... | ... | ... | ... |
| (N−2) | 1 | 1 | 0 |
| (N−1) | 1 | 1 | 0 |

DISK 50 (NON-VOLATILE)

| ADDR. | DATA | DISK TAGS |
|---|---|---|
| 0 | DATA | 1 |
| 1 | DATA | 1 |
| 2 | DATA | 1 |
| 3 | DATA | 1 |
| 4 | DATA | 1 |
| 5 | DATA | 1 |
| 6 | DATA | 1 |
| ... | ... | ... |
| (N−2) | DATA | 1 |
| (N−1) | DATA | 1 |

MEMORY ARRAY 32 (VOLITILE)

| ADDR. | DATA |
|---|---|
| 0 | DATA |
| 1 | DATA |
| 2 | DATA |
| 3 | DATA# |
| 4 | DATA |
| 5 | DATA# |
| 6 | DATA |
| ... | ... |
| (N−2) | DATA |
| (N−1) | DATA |

FIG. 3H (AT T8)

DISK 50 (NON-VOLATILE)

| ADDR. | SBT nv 52 | SBT nv 54 | TAG 60 | TBL. VAL. 62 |
|---|---|---|---|---|
| 0 | 0 | 0 | 1 | 0 |
| 1 | 0 | 0 | | |
| 2 | 0 | 0 | | |
| 3 | 0 | 0 | | |
| 4 | 0 | 0 | | |
| 5 | 0 | 0 | | |
| 6 | 0 | 0 | | |
| ... | ... | ... | | |
| (N−2) | 0 | 0 | | |
| (N−1) | 0 | 0 | | |
| CNTR | 0 | 1 | | |
| | 90 | 92 | | |

TABLES MEMORY 34 (VOLITILE)

| ADDR. | AVT 40 | DVT 42 | SBT V 44 |
|---|---|---|---|
| 0 | 1 | 1 | 0 |
| 1 | 1 | 1 | 0 |
| 2 | 1 | 1 | 0 |
| 3 | 1 | 0 | 0 |
| 4 | 1 | 1 | 0 |
| 5 | 1 | 0 | 0 |
| 6 | 1 | 1 | 0 |
| ... | ... | ... | ... |
| (N−2) | 1 | 1 | 0 |
| (N−1) | 1 | 1 | 0 |

DISK 50 (NON-VOLATILE)

| ADDR. | DATA | DISK TAGS |
|---|---|---|
| 0 | DATA | 1 |
| 1 | DATA | 1 |
| 2 | DATA | 1 |
| 3 | DATA# | 1 |
| 4 | DATA | 1 |
| 5 | DATA | 1 |
| 6 | DATA | 1 |
| ... | ... | ... |
| (N-2) | DATA | 1 |
| (N-1) | DATA | 1 |

MEMORY ARRAY 32 (VOLITILE)

| ADDR. | DATA |
|---|---|
| 0 | DATA |
| 1 | DATA |
| 2 | DATA |
| 3 | DATA# |
| 4 | DATA |
| 5 | DATA# |
| 6 | DATA |
| ... | ... |
| (N-2) | DATA |
| (N-1) | DATA |

FIG. 21 (AT T9)

DISK 50 (NON-VOLATILE)

| ADDR. | SBT nv 52 | SBT nv 54 | TAG 60 | TBL. VAL. 62 |
|---|---|---|---|---|
| 0 | 0 | 0 | 1 | 0 |
| 1 | 0 | 0 | | |
| 2 | 0 | 0 | | |
| 3 | 0 | 0 | | |
| 4 | 0 | 0 | | |
| 5 | 0 | 0 | | |
| 6 | 0 | 0 | | |
| ... | ... | ... | | |
| (N-2) | 0 | 0 | | |
| (N-1) | 0 | 0 | | |
| CNTR | 0 | 1 | | |
| | 90 | 92 | | |

TABLES MEMORY 34 (VOLITILE)

| ADDR. | AVT 40 | DVT 42 | SBT$_V$ 44 |
|---|---|---|---|
| 0 | 1 | 1 | 0 |
| 1 | 1 | 1 | 0 |
| 2 | 1 | 1 | 0 |
| 3 | 1 | 1 | 0 |
| 4 | 1 | 1 | 0 |
| 5 | 1 | 0 | 0 |
| 6 | 1 | 1 | 0 |
| ... | ... | ... | ... |
| (N-2) | 1 | 1 | 0 |
| (N-1) | 1 | 1 | 0 |

FIG. 31 (AT T9)

DISK 50 (NON-VOLATILE)

| ADDR. | DATA | DISK TAGS |
|---|---|---|
| 0 | DATA | 1 |
| 1 | DATA | 1 |
| 2 | DATA | 1 |
| 3 | DATA# | 1 |
| 4 | DATA | 1 |
| 5 | DATA# | 1 |
| 6 | DATA | 1 |
| ... | ... | ... |
| (N-2) | DATA | 1 |
| (N-1) | DATA | 1 |

MEMORY ARRAY 32 (VOLITILE)

| ADDR. | DATA |
|---|---|
| 0 | DATA |
| 1 | DATA |
| 2 | DATA |
| 3 | DATA# |
| 4 | DATA |
| 5 | DATA# |
| 6 | DATA |
| ... | ... |
| (N-2) | DATA |
| (N-1) | DATA |

FIG. 2J (AT T10)

DISK 50 (NON-VOLATILE)

| ADDR. | SBT nv 52 | SBT nv 54 | TAG 60 | TBL. VAL. 62 |
|---|---|---|---|---|
| 0 | 0 | 0 | 1 | 0 |
| 1 | 0 | 0 | | |
| 2 | 0 | 0 | | |
| 3 | 0 | 0 | | |
| 4 | 0 | 0 | | |
| 5 | 0 | 0 | | |
| 6 | 0 | 0 | | |
| ... | ... | ... | | |
| (N-2) | 0 | 0 | | |
| (N-1) | 0 | 0 | | |
| CNTR | 0 | 1 | | |
| | 90 | 92 | | |

TABLES MEMORY 34 (VOLITILE)

| ADDR. | AVT 40 | DVT 42 | SBT$_V$ 44 |
|---|---|---|---|
| 0 | 1 | 1 | 0 |
| 1 | 1 | 1 | 0 |
| 2 | 1 | 1 | 0 |
| 3 | 1 | 1 | 0 |
| 4 | 1 | 1 | 0 |
| 5 | 1 | 1 | 0 |
| 6 | 1 | 1 | 0 |
| ... | ... | ... | ... |
| (N-2) | 1 | 1 | 0 |
| (N-1) | 1 | 1 | 0 |

FIG. 3J (AT T10)

DISK 50 (NON-VOLATILE)

| ADDR. | DATA | DISK TAGS |
|---|---|---|
| 0 | DATA | 1 |
| 1 | DATA | 1 |
| 2 | DATA | 1 |
| 3 | DATA | 1 |
| 4 | DATA | 1 |
| 5 | DATA | 1 |
| 6 | DATA | 1 |
| ... | ... | ... |
| (N-2) | DATA | 1 |
| (N-1) | DATA | 1 |

MEMORY ARRAY 32 (VOLITILE)

| ADDR. | DATA |
|---|---|
| 0 | DATA |
| 1 | DATA# |
| 2 | DATA |
| 3 | DATA# |
| 4 | DATA# |
| 5 | DATA |
| 6 | DATA# |
| ... | ... |
| (N-2) | DATA |
| (N-1) | DATA |

FIG. 2K (AT T11)

DISK 50 (NON-VOLATILE)

| ADDR. | SBT nv 52 | SBT nv 54 | TAG 60 | TBL. VAL. 62 |
|---|---|---|---|---|
| 0 | 0 | 0 | 1 | 0 |
| 1 | 0 | 0 | | |
| 2 | 0 | 0 | | |
| 3 | 0 | 0 | | |
| 4 | 0 | 0 | | |
| 5 | 0 | 0 | | |
| 6 | 0 | 0 | | |
| ... | ... | ... | | |
| (N-2) | 0 | 0 | | |
| (N-1) | 0 | 0 | | |
| CNTR | 0 | 1 | | |
| | 90 | 92 | | |

TABLES MEMORY 34 (VOLITILE)

| ADDR. | AVT 40 | DVT 42 | SBT$_V$ 44 |
|---|---|---|---|
| 0 | 1 | 1 | 0 |
| 1 | 1 | 0 | 0 |
| 2 | 1 | 1 | 0 |
| 3 | 1 | 0 | 0 |
| 4 | 1 | 0 | 0 |
| 5 | 1 | 1 | 0 |
| 6 | 1 | 0 | 0 |
| ... | ... | ... | ... |
| (N-2) | 1 | 1 | 0 |
| (N-1) | 1 | 1 | 0 |

FIG. 3K (AT T11)

DISK 50 (NON-VOLATILE)

| ADDR. | DATA | DISK TAGS |
|---|---|---|
| 0 | DATA | 1 |
| 1 | DATA# | 1 |
| 2 | DATA | 1 |
| 3 | DATA | 1 |
| 4 | DATA | 1 |
| 5 | DATA | 1 |
| 6 | DATA | 1 |
| ... | ... | ... |
| (N-2) | DATA | 1 |
| (N-1) | DATA | 1 |

MEMORY ARRAY 32 (VOLITILE)

| ADDR. | DATA |
|---|---|
| 0 | DATA |
| 1 | DATA# |
| 2 | DATA |
| 3 | DATA# |
| 4 | DATA# |
| 5 | DATA |
| 6 | DATA# |
| ... | ... |
| (N-2) | DATA |
| (N-1) | DATA |

FIG. 2L (AT T12)

DISK 50 (NON-VOLATILE)

| ADDR. | SBTnv 52 | SBTnv 54 | TAG 60 | TBL. VAL. 62 |
|---|---|---|---|---|
| 0 | 0 | 0 | 1 | 0 |
| 1 | 0 | 0 | | |
| 2 | 0 | 0 | | |
| 3 | 0 | 0 | | |
| 4 | 0 | 0 | | |
| 5 | 0 | 0 | | |
| 6 | 0 | 0 | | |
| ... | ... | ... | | |
| (N-2) | 0 | 0 | | |
| (N-1) | 0 | 0 | | |
| CNTR | 0 | 1 | | |
|  | 90 | 92 | | |

TABLES MEMORY 34 (VOLITILE)

| ADDR. | AVT 40 | DVT 42 | SBT$_V$ 44 |
|---|---|---|---|
| 0 | 1 | 1 | 0 |
| 1 | 1 | 1 | 0 |
| 2 | 1 | 1 | 0 |
| 3 | 1 | 0 | 0 |
| 4 | 1 | 0 | 0 |
| 5 | 1 | 1 | 0 |
| 6 | 1 | 0 | 0 |
| ... | ... | ... | ... |
| (N-2) | 1 | 1 | 0 |
| (N-1) | 1 | 1 | 0 |

FIG. 3L (AT T12)

DISK 50 (NON-VOLATILE)

| ADDR. | DATA | DISK TAGS |
|---|---|---|
| 0 | DATA | 1 |
| 1 | DATA# | 1 |
| 2 | DATA | 1 |
| 3 | DATA | 1 |
| 4 | DATA | 1 |
| 5 | DATA | 1 |
| 6 | DATA | 1 |
| ... | ... | ... |
| (N-2) | DATA | 1 |
| (N-1) | DATA | 1 |

MEMORY ARRAY 32 (VOLITILE)

| ADDR. | DATA |
|---|---|
| 0 | DATA |
| 1 | DATA# |
| 2 | DATA |
| 3 | DATA# |
| 4 | DATA# |
| 5 | DATA |
| 6 | DATA# |
| ... | ... |
| (N-2) | DATA |
| (N-1) | DATA |

FIG. 2M (AT T13)

DISK 50 (NON-VOLATILE)

| ADDR. | SBT nv 52 | SBT nv 54 | TAG 60 | TBL. VAL. 62 |
|---|---|---|---|---|
| 0 | 1 | 0 | 2 | 1 |
| 1 | 1 | 0 | | |
| 2 | 1 | 0 | | |
| 3 | 0 | 0 | | |
| 4 | 0 | 0 | | |
| 5 | 1 | 0 | | |
| 6 | 0 | 0 | | |
| ... | ... | ... | | |
| (N-2) | 1 | 0 | | |
| (N-1) | 1 | 0 | | |
| CNTR | 2 | 1 | | |
| | 90 | 92 | | |

TABLES MEMORY 34 (VOLITILE)

| ADDR. | AVT 40 | DVT 42 | SBT$_V$ 44 |
|---|---|---|---|
| 0 | 1 | 1 | 0 |
| 1 | 1 | 1 | 0 |
| 2 | 1 | 1 | 0 |
| 3 | 1 | 0 | 0 |
| 4 | 1 | 0 | 0 |
| 5 | 1 | 1 | 0 |
| 6 | 1 | 0 | 0 |
| ... | ... | ... | ... |
| (N-2) | 1 | 1 | 0 |
| (N-1) | 1 | 1 | 0 |

FIG. 3M (AT T13)

DISK 50 (NON-VOLATILE)

| ADDR. | DATA | DISK TAGS |
|---|---|---|
| 0 | DATA | 1 |
| 1 | DATA# | 1 |
| 2 | DATA | 1 |
| 3 | DATA# | 2 |
| 4 | DATA | 1 |
| 5 | DATA | 1 |
| 6 | DATA | 1 |
| ... | ... | ... |
| (N-2) | DATA | 1 |
| (N-1) | DATA | 1 |

MEMORY ARRAY 32 (VOLITILE)

| ADDR. | DATA |
|---|---|
| 0 | DATA |
| 1 | DATA# |
| 2 | DATA |
| 3 | DATA# |
| 4 | DATA# |
| 5 | DATA |
| 6 | DATA# |
| ... | ... |
| (N-2) | DATA |
| (N-1) | DATA |

FIG. 2N (AT T14)

DISK 50 (NON-VOLATILE)

| ADDR. | SBT nv 52 | SBT nv 54 | TAG 60 | TBL. VAL. 62 |
|---|---|---|---|---|
| 0 | 1 | 0 | 2 | 1 |
| 1 | 1 | 0 | | |
| 2 | 1 | 0 | | |
| 3 | 0 | 0 | | |
| 4 | 0 | 0 | | |
| 5 | 1 | 0 | | |
| 6 | 0 | 0 | | |
| ... | ... | ... | | |
| (N-2) | 1 | 0 | | |
| (N-1) | 1 | 0 | | |
| CNTR | 2 | 1 | | |
| | 90 | 92 | | |

TABLES MEMORY 34 (VOLITILE)

| ADDR. | AVT 40 | DVT 42 | SBTv 44 |
|---|---|---|---|
| 0 | 1 | 1 | 0 |
| 1 | 1 | 1 | 0 |
| 2 | 1 | 1 | 0 |
| 3 | 1 | 1 | 0 |
| 4 | 1 | 0 | 0 |
| 5 | 1 | 1 | 0 |
| 6 | 1 | 0 | 0 |
| ... | ... | ... | ... |
| (N-2) | 1 | 1 | 0 |
| (N-1) | 1 | 1 | 0 |

FIG. 3N (AT T14)

DISK 50
(NON-VOLATILE)

| ADDR. | DATA | DISK TAGS |
|---|---|---|
| 0 | DATA | 1 |
| 1 | DATA# | 1 |
| 2 | DATA | 1 |
| 3 | DATA# | 2 |
| 4 | DATA | 1 |
| 5 | DATA | 1 |
| 6 | DATA | 1 |
| ... | ... | ... |
| (N-2) | DATA | 1 |
| (N-1) | DATA | 1 |

MEMORY ARRAY 32
(VOLITILE)

| ADDR. | DATA |
|---|---|
| 0 | DATA |
| 1 | DATA# |
| 2 | DATA |
| 3 | DATA# |
| 4 | DATA# |
| 5 | DATA |
| 6 | DATA# |
| ... | ... |
| (N-2) | DATA |
| (N-1) | DATA |

FIG. 2O (AT T15)

DISK 50
(NON-VOLATILE)

| ADDR. | SBT nv 52 | SBT nv 54 | TAG 60 | TBL. VAL. 62 |
|---|---|---|---|---|
| 0 | 1 | 1 | 2 | 1 |
| 1 | 1 | 1 | | |
| 2 | 1 | 1 | | |
| 3 | 0 | 1 | | |
| 4 | 0 | 0 | | |
| 5 | 1 | 1 | | |
| 6 | 0 | 0 | | |
| ... | ... | ... | | |
| (N-2) | 1 | 1 | | |
| (N-1) | 1 | 1 | | |
| CNTR | 2 | 3 | | |
| | 90 | 92 | | |

TABLES MEMORY 34
(VOLITILE)

| ADDR. | AVT 40 | DVT 42 | SBT_V 44 |
|---|---|---|---|
| 0 | 1 | 1 | 0 |
| 1 | 1 | 1 | 0 |
| 2 | 1 | 1 | 0 |
| 3 | 1 | 1 | 0 |
| 4 | 1 | 0 | 0 |
| 5 | 1 | 1 | 0 |
| 6 | 1 | 0 | 0 |
| ... | ... | ... | ... |
| (N-2) | 1 | 1 | 0 |
| (N-1) | 1 | 1 | 0 |

FIG. 3O (AT T15)

DISK 50 (NON-VOLATILE)

| ADDR. | DATA | DISK TAGS |
|---|---|---|
| 0 | DATA | 1 |
| 1 | DATA# | 1 |
| 2 | DATA | 1 |
| 3 | DATA# | 2 |
| 4 | DATA# | 2 |
| 5 | DATA | 1 |
| 6 | DATA | 1 |
| ... | ... | ... |
| (N-2) | DATA | 1 |
| (N-1) | DATA | 1 |

MEMORY ARRAY 32 (VOLITILE)

| ADDR. | DATA |
|---|---|
| 0 | DATA |
| 1 | DATA# |
| 2 | DATA |
| 3 | DATA# |
| 4 | DATA# |
| 5 | DATA |
| 6 | DATA# |
| ... | ... |
| (N-2) | DATA |
| (N-1) | DATA |

FIG. 2P (AT T16)

DISK 50 (NON-VOLATILE)

| ADDR. | SBT nv 52 | SBT nv 54 | TAG 60 | TBL. VAL. 62 |
|---|---|---|---|---|
| 0 | 1 | 1 | 2 | 1 |
| 1 | 1 | 1 | | |
| 2 | 1 | 1 | | |
| 3 | 0 | 1 | | |
| 4 | 0 | 0 | | |
| 5 | 1 | 1 | | |
| 6 | 0 | 0 | | |
| ... | ... | ... | | |
| (N-2) | 1 | 1 | | |
| (N-1) | 1 | 1 | | |
| CNTR | 2 | 3 | | |
| | 90 | 92 | | |

TABLES MEMORY 34 (VOLITILE)

| ADDR. | AVT 40 | DVT 42 | SBT$_V$ 44 |
|---|---|---|---|
| 0 | 1 | 1 | 0 |
| 1 | 1 | 1 | 0 |
| 2 | 1 | 1 | 0 |
| 3 | 1 | 1 | 0 |
| 4 | 1 | 1 | 0 |
| 5 | 1 | 1 | 0 |
| 6 | 1 | 0 | 0 |
| ... | ... | ... | ... |
| (N-2) | 1 | 1 | 0 |
| (N-1) | 1 | 1 | 0 |

FIG. 3P (AT T16)

DISK 50 (NON-VOLATILE)

| ADDR. | DATA | DISK TAGS |
|---|---|---|
| 0 | DATA | 1 |
| 1 | DATA# | 1 |
| 2 | DATA | 1 |
| 3 | DATA# | 2 |
| 4 | DATA# | 2 |
| 5 | DATA | 1 |
| 6 | DATA | 1 |
| ... | ... | ... |
| (N-2) | DATA | 1 |
| (N-1) | DATA | 1 |

MEMORY ARRAY 32 (VOLITILE)

| ADDR. | DATA |
|---|---|
| 0 | * |
| 1 | * |
| 2 | * |
| 3 | * |
| 4 | * |
| 5 | * |
| 6 | * |
| ... | ... |
| (N-2) | * |
| (N-1) | * |

FIG. 2Q (AT T17)

DISK 50 (NON-VOLATILE)

| ADDR. | SBT nv 52 | SBT nv 54 | TAG 60 | TBL. VAL. 62 |
|---|---|---|---|---|
| 0 | 1 | 1 | 2 | 1 |
| 1 | 1 | 1 | | |
| 2 | 1 | 1 | | |
| 3 | 0 | 1 | | |
| 4 | 0 | 0 | | |
| 5 | 1 | 1 | | |
| 6 | 0 | 0 | | |
| ... | ... | ... | | |
| (N-2) | 1 | 1 | | |
| (N-1) | 1 | 1 | | |
| CNTR | 2 | 3 | | |
|  | 90 | 92 | | |

TABLES MEMORY 34 (VOLITILE)

| ADDR. | AVT 40 | DVT 42 | SBT$_V$ 44 |
|---|---|---|---|
| 0 | * | * | * |
| 1 | * | * | * |
| 2 | * | * | * |
| 3 | * | * | * |
| 4 | * | * | * |
| 5 | * | * | * |
| 6 | * | * | * |
| ... | ... | ... | ... |
| (N-2) | * | * | * |
| (N-1) | * | * | * |

FIG. 3Q (AT T17)

DISK 50 (NON-VOLATILE)

| ADDR. | DATA | DISK TAGS |
|---|---|---|
| 0 | DATA | 1 |
| 1 | DATA# | 1 |
| 2 | DATA | 1 |
| 3 | DATA# | 2 |
| 4 | DATA# | 2 |
| 5 | DATA | 1 |
| 6 | DATA | 1 |
| ... | ... | ... |
| (N−2) | DATA | 1 |
| (N−1) | DATA | 1 |

MEMORY ARRAY 32 (VOLITILE)

| ADDR. | DATA |
|---|---|
| 0 | * |
| 1 | * |
| 2 | * |
| 3 | * |
| 4 | * |
| 5 | * |
| 6 | * |
| ... | ... |
| (N−2) | * |
| (N−1) | * |

FIG. 2R (AT T18)

DISK 50 (NON-VOLATILE)

| ADDR. | SBT nv 52 | SBT nv 54 | TAG 60 | TBL. VAL. 62 |
|---|---|---|---|---|
| 0 | 1 | 1 | 2 | 1 |
| 1 | 1 | 1 | | |
| 2 | 1 | 1 | | |
| 3 | 0 | 1 | | |
| 4 | 0 | 0 | | |
| 5 | 1 | 1 | | |
| 6 | 0 | 0 | | |
| ... | ... | ... | | |
| (N−2) | 1 | 1 | | |
| (N−1) | 1 | 1 | | |
| CNTR | 2 | 3 | | |
|  | 90 | 92 | | |

TABLES MEMORY 34 (VOLITILE)

| ADDR. | AVT 40 | DVT 42 | SBT$_V$ 44 |
|---|---|---|---|
| 0 | 0 | 0 | 1 |
| 1 | 0 | 0 | 1 |
| 2 | 0 | 0 | 1 |
| 3 | 0 | 0 | 1 |
| 4 | 0 | 0 | 0 |
| 5 | 0 | 0 | 1 |
| 6 | 0 | 0 | 0 |
| ... | ... | ... | ... |
| (N−2) | 0 | 0 | 1 |
| (N−1) | 0 | 0 | 1 |

FIG. 3R (AT T18)

DISK 50
(NON-VOLATILE)

| ADDR. | DATA | DISK TAGS |
|---|---|---|
| 0 | DATA | 1 |
| 1 | DATA# | 1 |
| 2 | DATA | 1 |
| 3 | DATA# | 2 |
| 4 | DATA# | 2 |
| 5 | DATA | 1 |
| 6 | DATA | 1 |
| ... | ... | ... |
| (N-2) | DATA | 1 |
| (N-1) | DATA | 1 |

MEMORY ARRAY 32
(VOLITILE)

| ADDR. | DATA |
|---|---|
| 0 | * |
| 1 | * |
| 2 | * |
| 3 | * |
| 4 | DATA# |
| 5 | * |
| 6 | * |
| ... | ... |
| (N-2) | * |
| (N-1) | * |

FIG. 2S (AT T19)

DISK 50
(NON-VOLATILE)

| ADDR. | SBT nv 52 | SBT nv 54 | TAG 60 | TBL. VAL. 62 |
|---|---|---|---|---|
| 0 | 1 | 1 | 2 | 1 |
| 1 | 1 | 1 | | |
| 2 | 1 | 1 | | |
| 3 | 0 | 1 | | |
| 4 | 0 | 0 | | |
| 5 | 1 | 1 | | |
| 6 | 0 | 0 | | |
| ... | ... | ... | | |
| (N-2) | 1 | 1 | | |
| (N-1) | 1 | 1 | | |
| CNTR | 2 | 3 | | |
| | 90 | 92 | | |

TABLES MEMORY 34
(VOLITILE)

| ADDR. | AVT 40 | DVT 42 | SBT$_V$ 44 |
|---|---|---|---|
| 0 | 0 | 0 | 1 |
| 1 | 0 | 0 | 1 |
| 2 | 0 | 0 | 1 |
| 3 | 0 | 0 | 1 |
| 4 | 1 | 1 | 0 |
| 5 | 0 | 0 | 1 |
| 6 | 0 | 0 | 0 |
| ... | ... | ... | ... |
| (N-2) | 0 | 0 | 1 |
| (N-1) | 0 | 0 | 1 |

FIG. 3S (AT T19)

DISK 50 (NON-VOLATILE)

| ADDR. | DATA | DISK TAGS |
|---|---|---|
| 0 | DATA | 1 |
| 1 | DATA# | 1 |
| 2 | DATA | 1 |
| 3 | DATA# | 2 |
| 4 | DATA# | 2 |
| 5 | DATA | 1 |
| 6 | DATA | 1 |
| ... | ... | ... |
| (N-2) | DATA | 1 |
| (N-1) | DATA | 1 |

MEMORY ARRAY 32 (VOLITILE)

| ADDR. | DATA |
|---|---|
| 0 | DATA |
| 1 | * |
| 2 | * |
| 3 | * |
| 4 | DATA# |
| 5 | * |
| 6 | * |
| ... | ... |
| (N-2) | * |
| (N-1) | * |

FIG. 2T (AT T20)

DISK 50 (NON-VOLATILE)

| ADDR. | SBT nv 52 | SBT nv 54 | TAG 60 | TBL. VAL. 62 |
|---|---|---|---|---|
| 0 | 1 | 1 | 2 | 1 |
| 1 | 1 | 1 | | |
| 2 | 1 | 1 | | |
| 3 | 0 | 1 | | |
| 4 | 0 | 0 | | |
| 5 | 1 | 1 | | |
| 6 | 0 | 0 | | |
| ... | ... | ... | | |
| (N-2) | 1 | 1 | | |
| (N-1) | 1 | 1 | | |
| CNTR | 2 | 3 | | |
| | 90 | 92 | | |

TABLES MEMORY 34 (VOLITILE)

| ADDR. | AVT 40 | DVT 42 | SBT$_V$ 44 |
|---|---|---|---|
| 0 | 1 | 1 | 1 |
| 1 | 0 | 0 | 1 |
| 2 | 0 | 0 | 1 |
| 3 | 0 | 0 | 1 |
| 4 | 1 | 1 | 0 |
| 5 | 0 | 0 | 1 |
| 6 | 0 | 0 | 0 |
| ... | ... | ... | ... |
| (N-2) | 0 | 0 | 1 |
| (N-1) | 0 | 0 | 1 |

FIG. 3T (AT T20)

SOLID STATE DISK DRIVE UNIT HAVING ON-BOARD BACKUP NON-VOLATILE MEMORY

FIELD OF THE INVENTION

This invention relates to a solid state disk drive, and more particularly a solid state disk drive which continuously saves unique data in the volatile memory into the non-volatile memory, and keeps track of which data in the volatile memory has not been backed up after a power outage.

BACKGROUND OF THE INVENTION

A disk drive is typically used as a mass storage device for an individual computer, or multiple computers linked together in a network configuration. One type of disk drive, used to service one or more host computers, is a solid state disk drive. Unlike the more common disk drives, which typically include only a magnetic disk for data storage, solid state disk drives include a combination of a magnetic disk and electronic RAM memory.

Although even common disk drives may have some RAM memory, that electronic memory is relatively very small compared to the storage capacity of the disk. Usually that small electronic RAM is used as a temporary storage buffer for data transmitted to or from the magnetic disk. In solid state disks, however, the capacity of the RAM memory is approximately the same as the capacity of the magnetic disk. This is due to the fact that the RAM is the memory source used directly by the host computer during processing operations, with the disk used principally to back up the RAM.

When a solid state disk is powered up, the data stored in the magnetic disk will be copied to the RAM. During processing operations, a connected host computer will typically retrieve data from the RAM, modify that data, and ultimately write the modified data back into the RAM. In this respect, it is not uncommon for the RAM to contain the only valid version of the data, since the RAM data is written back to the magnetic disk only when there is an unplanned loss of primary electric power, or there is a planned shut down of the drive.

Given that the RAM portion of the solid state disk drive can operate only when electric power is supplied, the electronic memory is considered a "volatile" memory. On the other hand, the magnetic disk is a "non-volatile" memory given that once it is written to, data is preserved even if electric power is lost. Thus it is quite important to insure that all of the data that is contained in RAM is also contained on the magnetic disk before power to the drive is completely terminated, or else unique data in the RAM will be lost.

One problem that has been encountered in connection with many solid state disk drives is that it is not always possible to predict when power to the system may be lost. An unexpected power shortage, such as a black out, is a common cause of an unplanned loss of primary power to the system. In order to protect against such unplanned losses of power, many solid state disk drives include an auxiliary power supply, such as batteries. Thus, in the event of a power shortage, the batteries will power the system so that data can be saved from the volatile Ram to the non-volatile disk.

On the other hand, even those systems supported with back up power can loose data stored in the RAM. For example, certain solid state disk drives have very large capacity memories such that it may take as long as 20 minutes to completely saved the contents of the RAM memory onto the disk. Using such a drive as an example, if there was a power shortage, and the batteries did not contain enough power to run the system for the full 20 minutes, not all of the data in the RAM would have been backed up before the battery power was lost. Consequently, when power was restored at a later time, it would not be possible to distinguish between data on the disk that is good, because it was saved from RAM, and data on the disk that is bad, because it is an older version of the data never replaced by the newer data in the Accordingly, what is needed is a solid state disk drive which protects against the loss of data in the volatile memory. More specifically, what is needed is a drive which continuously saves the data in the RAM onto the disk, so that, to the greatest extent possible, the disk contains a redundant copy of the data in the RAM. Furthermore, what is needed is a solid state disk drive that, if it should loose its auxiliary power before it has completely saved the RAM data onto the disk, the drive is later able to differentiate the data on the disk that is good from the data that is bad when power is restored. Thereby the drive is able to at least partially restore the data on the disk to the RAM, and identify which disk data is bad.

SUMMARY OF THE INVENTION

This invention relates to a storage apparatus, such as a solid state disk drive which may be used to support a host computer. The apparatus has a non volatile memory device, such as a disk, and volatile memory device, such as an electronic RAM. At the commencement of the operation of the apparatus, data is typically restored from the disk drive to the RAM, so that the data in the RAM is accessible to a host computer in as short a time as possible, the access times of the RAM being shorter than the access times of the disk.

During ordinary operation, data restored from the disk to the RAM may be used and modified by the host computer, with the modified data being stored by the host in the RAM. Consequently, there may be times when the RAM includes the only valid copy of data, namely the data as modified by the host. Accordingly, the present invention includes a means for indicating that data stored in the RAM has been modified after it was restored from the disk to the RAM. For example, that indicating means could be a table which stores data indicating which data in the RAM has been modified.

In other embodiments of the invention the apparatus includes a processing means which scans the indicating means, and then saves back to the disk the modified data which is in the RAM. In this manner, the disk is constantly updated with the most current version of the data, tending to achieve an identity between the data stored in the disk and the data stored in the RAM, even though the data in the RAM can be modified by the host.

Yet other embodiments of the invention include the method of keeping track of modified data in the RAM, and saving the modified data on the disk.

Given that this description only briefly summarizes the invention, a more complete understanding of the invention, as well as its objects, features, and advantages will be appreciated upon consideration of the following detailed description of the preferred embodiment, presented in conjunction with the accompanying drawings, and the claims.

BRIEF DESCRIPTION OF THE DRAWINGS

FIGS. 2A–2T are a series of time based, block illustrations of the contents of the disk and memory array shown in FIG. 1.

FIGS. 3A–3T are a series of time based, block illustrations of the contents of the disk and tables memory shown in FIG. 1.

DETAILED DESCRIPTION OF THE PREFERRED EMBODIMENT

A. Disk Drive Overview

Figure 1:
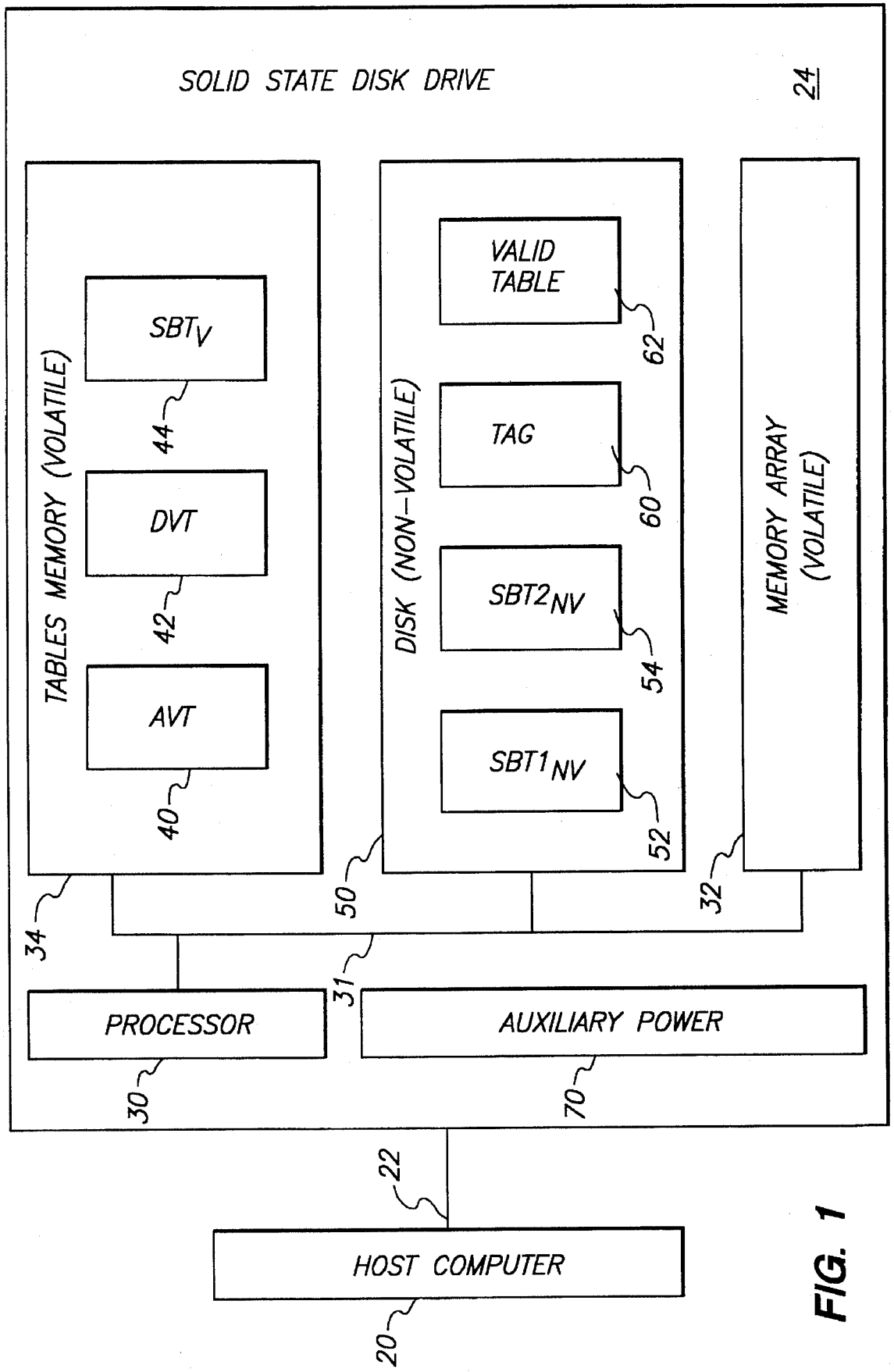
FIG. 1 is a block diagram of a disk drive in accordance with the present invention, the drive containing a processor, a volatile tables memory, a volatile memory array, a non volatile magnetic disk, and auxiliary power.

Referring first to FIG. 1, an embodiment of a solid state disk drive in accordance with the present invention is provided. Host computer 20 is coupled over I/O bus 22 to solid state disk drive 24. Drive 24 includes processor 30, which is the central processing unit controlling all operations within drive 24. Processor 30 is coupled via an internal bus structure 31 to memory array 32, which is a volatile, electronic RAM memory having a storage capacity typically ranging from 100 Mbytes to 1 Gbytes. Memory array 32 contains the data used by host 20 during processing operations.

In addition, processor 30 is coupled to tables memory 34, which is also a volatile, electronic RAM, albeit considerably smaller than memory array 32. As seen in FIG. 1, tables memory 34 contains three memory tables, "Array Valid Table" (AVT 40), Disk Valid Table" (DVT 42), and "Suspect Bit Table (volatile)" (SBTv 44).

Still referring to FIG. 1, in drive 24 processor 30 is also coupled to a non-volatile magnetic disk 50, which also has a storage capacity ranging from 100 Mbytes to 1 Gbytes. Disk 50 is coupled to tables memory 34 and memory array 32 via bus structure 31 so that data can be copied back and forth from either to disk 50. Although in the preferred embodiment disk 50 is a magnetic disk, in other embodiment other non-volatile memory devices could be used. For example, other disk drives combine magnetics and optics to provide a magneto-optical disk drive. The important feature of the non volatile memory is that the data in the memory is not lost when power to drive 24 is lost.

In addition to being able to generally store memory array 32 data, disk 50 further includes two "Suspect Bit Tables (non-volatile)", one of which is identified as SBT1nv 52 and the other SBT2nv 54. As will be detailed below, SBT1nv 52 and SBT2nv 54 are almost redundant copies of DVT 42. They are used for the purpose of preserving a back up copy of DVT 42 on disk. As will be detailed below, there will typically be some differences in their contents, however, due to the fact that they receive copies the of contents of DVT 42 at different times, and the contents of DVT 42 typically changes over time.

Also seen in FIG. 1, disk 50 further includes two additional data fields, TAG 60 and TABLES VALID 62.

Although through this brief overview each of the major components of drive 24 are identified, details relating to the configuration and purpose of the tables and data fields in table memory 34 and disk 50 are provided below.

To the extent that drive 24 is a solid state disk drive, in its normal mode of operation, host 20 will periodically "read" data from drive 24 so that host 20 can use that data for its processing operations. Additionally, host 20 will periodically "write" data to drive 24 so that the data is stored for later access. Most of the time, drive 24 is freely accessible for such read/write operations, referred to as the "WRITE ENABLE" mode. Under certain conditions however drive 24 may have to protect itself from write access by host 20 because it is not yet ready for host 20 access, or drive 24 needs to take measures to preserve the integrity of the data in drive 24. This is referred to as a "WRITE PROTECT" mode, and may occur when drive 24 is first started, or when there is a loss of primary power. Under yet other conditions, drive 24 may be inaccessible to host 20 for either read or write access, which is referred to as the "OFF LINE" mode.

A further characteristic of drive 24, as a solid state disk drive, is that when host 20 reads from or writes to drive 24, it is actually exchanging data directly with memory array 32, instead of disk 50. In other words, the advantage of a solid state disk drive 24 is that the data sought by the host 20 is directly accessed in the electronic memory, which makes the data available to host 20 much faster than if it had to be retrieved from a mechanically operated, and therefore slower, magnetic disk 50. On the other hand, in drive 24 disk 50 is used for back up storage purposes.

Finally with respect to FIG. 1, drive 24 includes auxiliary power 70, which in the preferred embodiment is a Ni:Cad battery back up. Thus, in the event that the main power source, such as a wall outlet having 120 V AC were to fail, due to a power outage or the like, auxiliary power 70 is able to run drive 24, so long as the batteries can provide adequate power.

B. Data Configuration on the Drive

In order to discuss the operation of drive 24, it is first helpful to consider the means by which data on disk 50 and memory array 32 is configured and addressed. Recalling that during the operation of drive 24, host 20 will exchange data with memory array 32, when drive 24 is started up, the data stored on disk 50 must be restored to memory array 32.

It should be noted at the outset of this detailed description that when information is transferred from disk 50 to memory array 32 that transfer will be generally referred to as a "restore", while the transfer of information from memory array 32 to disk 50 will be generally referred to as a "save". By following this convention, it is hoped that the exchange of information in drive 24 will be simpler to follow.

Although many storage and addressing methods may be used in different embodiments, general reference is now made to FIG. 2A to explain the storage and addressing method used in the preferred embodiment. It may be noted that FIG. 2A is actually one of a series of similar illustrations, extending from FIGS. 2A–2T, with each such drawing providing a block style illustration of the contents of disk 50, on the left, and memory array 32, on the right.

As seen by referring to FIG. 2A, disk 50 is divided into a number of logical addresses ranging from 0–(N–1). Each such address location contains a block of data, designated "DATA" on FIG. 2A. In the preferred embodiment, each such block of data is made up of five sectors of disk 50, so that each single address location effectively accesses five sectors of disk 50. Also shown on FIG. 2A, stored and associated with each such block of data is a DISK TAG value, which is a field capable of accommodating the storage of a number, not just a single binary bit. Still generally referring to FIG. 2A, another block diagram illustrates the format of memory array 32 and its address locations, which also range from 0 to (N–1).

Comparing the left and right sides of FIG. 2A, it can be seen that there is a direct correspondence between the address locations of disk 50 and memory array 32. Accordingly, when data is restored from disk 50 to memory array 32 the data in a given address on disk 50 will be copied to the corresponding address on memory array 32, and vice versa. For example, data in disk 50 address location 0 will be copied to memory array 32 address location 0, disk 50 address location 1 to memory array 32 address location 1, and so on.

Still considering the arrangement of data in drive 24, general reference is now made to FIG. 3A, which is also one of a series block diagram illustrations of AVT 40, DVT 42, SBTv 44 of tables memory 34, and SBT1nv 52, SBT2nv 54, TAG 60, and TABLES VALID 62 of disk 50. These block illustrations, extending from FIG. 3A–3T, will be used to discuss the method by which drive 24 manages data in memory array 32 and disk 50, in order to provide the speed of a solid state disk drive, while further providing maximum protection for the integrity of the data in memory array 32 and on disk 50.

In FIG. 3A, the three tables in tables memory 34 have address locations, ranging from 0–(N–1), which correspond to the similar address locations of memory array 32 and disk 50. Likewise the two tables on disk 50 have address locations, ranging from 0–(N–1), which also correspond to the address locations of memory array 32 and disk 50. At each of the address locations 0–(N–1) each of the five tables contain a single bit field, which can be set to the binary values 1 or 0. The significance of the settings in these fields is further detailed below.

Additionally, tables SBT1nv 52 and SBT2nv 54 each contain one additional counter field, respectively CNTR 90 and CNTR 92. Unlike the portions of the tables which contain a single binary bit, the counter fields are each able to store a non binary number, the purpose of which will also be discussed below.

FIG. 3A further illustrates the inclusion on disk 50 of TAG 60 and TABLES VALID 62, both of which were shown on FIG. 1. TAG 60 is also capable of holding a number, while TABLES VALID 62 is a single bit field such that it can be set to only binary 1 or 0.

In connection with the general consideration of FIGS. 2A–2T and 3A–3T, it should be noted that these figures provide a time based sequence of block drawings illustrating the changing contents disk 50, memory array 32, and the five tables and the other fields on disk 50 or tables memory 34. Such changing contents corresponding to the restoring, saving, and modifying of data in memory array 32 and disk 50. Accordingly, each of figures effectively provide a 'snap shot' of the contents of the disk 50, memory array 32, and the tables and fields by reference to a specific time, such as "T1", "T2" and so on With respect to the use of the terms "T1", "T2", and so on each is intended to indicate the relative sequence of time segments, but does not necessarily indicate any proximal relationship between or relative duration of the time segments. In other words, T1 is a time segment that occurs prior to T2, T2 is a time segment that occurs prior to T3, and likewise with respect to the other identified time segments. On the other hand, T2 is not necessarily the very next time segment after T1, as measured by a specific clocking mechanism, such as a system clock for example. Additionally, the use of the terms T1 and T2, for example, is not intended to suggest that the duration of any two such segments are necessarily the same.

Having considered the major components in drive 50 and the addressing and formatting of the data stored in drive 24, consideration can now be directed to the method by which drive 24 operates. Such consideration begins with a review of the method by which drive 24 initializes itself, so that data on disk 50 is copied into memory array 32 for access by host 20.

C. Disk Drive Initialization

In order to commence the operation of drive 24 it is necessary for the data on disk 50 to be restored into memory array 32 as part of an initialization process. Referring again to FIG. 2A, the illustration shows the state of disk 50 and memory array 32 at a point in time, T1, which is prior to the time that drive 24 is actually turned on. For the purpose of this hypothetical initialization, it will be assumed that at T1 disk 50 contains valid data that is to be restored into memory array 32. Accordingly, in FIG. 2A each of the address locations of disk 50 contain DATA.

On the other hand, it will be assumed that the DISK TAGS on disk 50 and all of memory array 32 effectively contain no data, or stated differently, contain no reliable data. This is especially true of memory array 32, given that, as a volatile memory, when the power to drive 24 is turned off, the electronic RAM cells do not contain anything other than possibly stray capacitative charges. Accordingly, in FIG. 2A the DISK TAGS on disk 50 the DATA field of memory array 32 are represented by the symbol "*", to indicate that at T1 these memory locations are effectively empty.

Referring once again to FIG. 3A, the contents of AVT 40, DVT 42, SBTv 44, SBT1nv 52, SBT2nv 54, TAG 60, and TABLES VALID 62 are shown during the time segment T1. Similar to the discussion above with respect to the DISK TAGS of disk 50 and memory array 32, as of T1 all of the contents of the listed tables and fields are assumed to be empty before the power to drive 24 is turned on.

Although for the purpose of explaining the initialization of drive 50 it has been assumed that the tables and fields on disk 50 are empty, it will be explained below that, in actual practice, after data is loaded onto disk 50, the tables and fields would also have information stored in them. For the purpose of more clearly explaining the origination of that information, however, in this portion of the detailed description they are assumed to be empty.

Referring next to FIGS. 2B and 3B, which takes place during time segment T2, it will be further assumed that at this point in time drive 24 is turned on. During initialization, processor 30 first places drive 24 in an OFF LINE mode, which, as will be detailed in connection with the discussion of FIGS. 2R–2T, 3R–3T and 4 below, transitions to a WRITE PROTECT mode. Until the WRITE PROTECT mode is changed to a WRITE ENABLE mode, host 20 will not be able to write to drive 24, although host 20 will be able to read from drive 24.

Additionally, during this initialization procedure, virtually all of the bits in the five tables, AVT 40, DVT 42, SBTv 44, SBT1nv 52, and SBT2nv 54, are initialized to "0" by processor 30, as shown in FIG. 3B. The CNTR 92 bit in SBT2nv, however, is set to binary 1, for reasons that will be discussed below.

Also, in FIG. 3B, it can be seen that in accordance with the initialization process the numerical value in TAG 60 is set to 1. Also, the binary TABLES VALID 62 bit is set to 1 indicating that, so long as drive 24 remains in the WRITE PROTECT mode, at least one of the tables on disk 50 are valid.

As yet another aspect of the initialization process, during time segment T2, processor 30 will set all of the DISK TAGS, shown on FIG. 2B, to the numerical value 1.

Processor 30 next instructs disk 50 to commence restoring the data contained on disk 50 to memory array 32, so that the data is accessible to host 20 for processing operations. Accordingly, during the time segment T3 drive 24 restores one block of data from disk 50 to memory array 32. Thus, the five sectors of data at disk 50 address location 0 are restored to memory array 32 address location 0, as shown on FIG. 2C.

Furthermore, in order to keep track of the restoring of data from disk 50 to memory array 32, AVT 40 in tables memory 34 will be updated by processor 30. The purpose of the AVT 40 table is to store information which indicates whether at a given point in time the contents of a disk 50 address location have been restored to the corresponding memory array 32 location. Referring to AVT 40 in FIG. 3C, processor 30 has changed the bit setting in address 0 from a binary 0 to a binary 1. This setting indicates that the data on disk 50 at the given address has been restored to the corresponding address in memory array 32. Changes to the binary settings at the other address locations of AVT 40 would likewise indicate that data in the corresponding address locations of disk 50 have been restored to memory array 32.

Additionally, processor 30 also updates DVT 42, the purpose of which is to store information indicating whether the contents of a given disk 50 address location is identical to the contents of the corresponding memory array 32 address location. In FIG. 3C it can be seen that the 0 binary value at address location 0 has been changed to a binary 1. This setting indicates that at the given time, T3, the data on disk 50 at address 0 is identical to the data in memory array 32. Like AVT 40, changes to the binary settings at the other address locations of DVT 40 would likewise indicate that data in the corresponding address locations of disk 50 is identical to that of memory array 32.

Referring next to FIGS. 2D and 3D, in the next time segment T4, under the direction of processor 30 disk 50 restores yet another block of data to memory array 32. In particular, the data at disk 50 address location 1 is restored to memory array 32 address location 1. Accordingly, referring to FIG. 2D, it can be seen that the data at address location 1 been restored from disk 50 to memory array 32. In FIG. 3D, the bit values at address locations 1 of ArT 40 and DVT 42 have been set to 1.

Extrapolating from the progression established in FIGS. 2B–2D and 3B–3D, it can be seen that disk 50 can continue to restore data to the other memory address locations of memory array 32. When disk 50 performs this restoration, the bits at the corresponding addresses in AVT 40 and DVT 42 will be changed from 0 to 1. In this manner, drive 24 keeps track of whether the data at a particular address on the disk 50 has been restored to memory array through the use of AVT 40. Also, drive 24 keeps track of whether the data at a particular address on the disk 50 is identical to the data in the memory array 32 through the use of DVT 42.

D. Out of Sequence Requests by Host

Although it is possible to have disk 50 completely fill memory array 32 with data before drive 24 is accessible to host 20 for the exchange of data, in the preferred embodiment, drive 24 is able to provide host 20 with data that has not yet been restored from disk 50 to memory array 32, while drive 24 is in the middle of the restoration process. In order to do so, drive 24 is changed from a WRITE PROTECT to a WRITE ENABLE mode before memory array 32 is fully restored from disk 50.

Referring back to FIGS. 2D and 3D, recall that by T4 disk 50 had restored the contents of disk 50 addresses 0 and 1 to memory array 32 addresses 0 and 1, respectively. It will next be assumed that as of time segment T5, processor 30 changes the state of drive 24 from that of a WRITE PROTECT mode to that of a WRITE ENABLE mode. Under the WRITE PROTECT mode drive 24 could not be accessed by host 20 for write operations; however, under the WRITE ENABLE mode drive 24 is so accessible to host 20.

In FIG. 3E it can be seen that the contents of the tables on disk 50 are the same as that in FIG. 2D, except for the bit setting of TABLES VALID 62. As a result of the transition from the WRITE PROTECT mode to the WRITE ENABLE mode, the bit setting of TABLES VALID 62 is changed from 1 to 0, indicating that the contents of SBT1nv 52 and SBT2nv 54 are no longer necessarily valid.

Additionally, during T5 it will be assumed that host 20 has requested from drive 24 certain data which processor 30 determines is contained in memory array 32 address location 3. Given that processor 30 would otherwise next restore the data at address 2, in order to respond to the request for the data at address 3 processor 30 will have to retrieve that data out of the established sequence of retrieval. Nonetheless, during time segment T5, also shown in FIG. 2E, the data in disk 50 address location 3 is restored to memory array 32 address location 3. Referring back to FIG. 3E, during T5 the bits are appropriately set to 1 in the corresponding address locations of AVT 40 and DVT 42.

With the specific data requested by the host 20 in memory array 32, drive 24 can now service the memory request of host 20 by providing the data at address location 3. Processor 30 can also return to the initialization process already underway, namely that of restoring the contents of drive 50 to memory array 32.

As a result of having entered the WRITE ENABLE mode, however, before progressing with the restoration of data from disk 50 to memory array 32, processor 30 scans the contents of AVT 40 to determine whether the data on the disk 50 has already been copied to memory array 32. Accordingly, given that processor 30 is scheduled to next restore the contents of disk 50 address location 2 to memory array 32 address location 2, processor 30 reviews the contents of AVT 40 corresponding to address location 2. Given that the bit is set at 0, as shown in FIG. 3E, processor 30 determines that the contents of the disk 50 at address 2 have not yet been restored to memory array 32.

As shown in FIGS. 2F and 3F, processor 30 next restores the contents of disk 50 address location 2 to memory address location 2 during time segment T6, and appropriately sets the corresponding bits to 1 in AVT 40 and DVT 42 address locations 2.

Pursuant to the sequence, processor 30 would next restore the data from disk 50 address location 3 to memory address location 3. As explained, processor 30 first scans the bit setting contained in AVT 40 at address location 3. When it does so, however, it determines from the corresponding bit setting of AVT 40 that the contents of disk 50 at address location 3 have already been restored to memory array 32 address location 3. Therefore, processor 30 progresses to the next address, namely address 4, to determine whether that data has been restored. Given that it has not, that data would next be restored in the manner discussed above.

The advantage of having the WRITE ENABLE mode lifted as soon as possible after the commencement of the initialization process is that the data on drive 24 is accessible to host 20 in as short a time as possible. Thus, whether drive 24 maintains the WRITE PROTECT mode until all data is restored from disk 50 to memory array 32, or whether drive 24 enters the WRITE ENABLE mode sooner, the data on disk 50 will eventually be restored to memory array 32, given that after servicing any out of sequence request for data, drive 24 returns to the sequential restoration of data.

For the purpose of this explanation, it will be assumed that at T7, shown in FIGS. 2G and 3G, all of the data on disk 50 has been restored to memory array 32. Accordingly, all of the bits in AVT 40 have been set to 1 indicating that all of the data on disk 50 has been restored. Also, all of the bits in DVT 42 have been set to 1 indicating that the contents of the address locations of disk 50 are identical to the contents of the corresponding address locations of memory array 32.

E. Host 20 Modifications of Data

It can be anticipated that as part of its processing operations host 20 will modify the data in drive 24. For example, it is common for host 20 to request data from drive 24, perform some processing operation on the data, and then return the modified data to drive 24 for storage. Using this general hypothetical as a basis, reference is now made back to FIGS. 2G and 3G, through which it was explained that all of the data in drive 24 is restored to memory array 32, and that the contents of memory array 32 and disk 50 are identical.

It will next be assumed that host 20 requests data at address locations 3 and 5, for example, which is supplied to host 20 out of memory array 32. Additionally, it will be assumed that host 20 modifies the data, and transmits the modified data back to drive 24 for storage. When the modified data is transmitted back by host 20, it will be stored in address locations 3 and 5, respectively, of memory array 32. In accordance with this detailed explanation and as shown in FIG. 2H, modified data in memory array 32 and disk 50 is represented by the term "DATA#", with the added symbol "#" indicating that the original data has been changed. For example, during T8 it can be seen that at address locations 3 and 5 of memory array 32 contain "DATA#", while the corresponding address locations on disk 50 contain "DATA".

Recalling that the function of DVT 42 is to track the correspondence between data in memory array 32 and disk 50, when the modified data is transmitted from host 20 to drive memory array 32, processor 30 will change the bits at address locations 3 and 5 of DVT 42 to 0. The new bit settings, shown on FIG. 3H, thereby indicate that at T8 the data on disk 50 at address locations 3 and 5 is not the same as the data in memory array 32. Therefore, that disk 50 data is no longer valid.

In accordance with the present invention, during the operation of drive 24 processor 30 continuously scans the contents of DVT 42 to determine if there is any lack of identity between the contents of memory array 32 and disk 50. As shown on FIG. 3H, as of T8 processor 30 will discover that the contents of memory array 32 address locations 3 and 5 are different from the contents of disk 50 address locations 3 and 5, by detecting the corresponding 0 bit setting in DVT 42. In response to the differing contents of address location 3, processor 30 next instructs memory array 32 to save the contents of memory array 32 address location 3 to disk 50 address location 3.

Referring now to FIG. 2I, during T9 data at address location 3 of memory array 32 is saved to disk 50 address location 3, such that as of T9 disk 50 contains the modified data, DATA#. Correspondingly as shown in FIG. 3I, as of T9 processor 30 has reset the bit at address location 3 of DVT 42 to 1, indicating that the contents of disk 50 and the contents of memory array 32 at address 3 are identical.

In connection with the updating of disk 50, processor 30 will also save the then current value of TAG 60 into the DISK TAG corresponding to disk 50 address 3. Referring back to FIG. 2I it can be seen that the corresponding DISK TAG for address location 3 is still 1, given that TAG 60, shown in FIG. 3I is 1, as of T9.

As of T9, shown on FIG. 2I and 3I, there is still a difference in the contents of address location 5 of memory array 32 and disk 50. Having detected the 0 bit setting in address location 5 of DVT 42, at T10 processor 30 next copies the contents at address location 5 of memory array 32 to disk 50 address location 5, as shown in FIG. 2J. Having done so, processor 30 resets the corresponding bit in DVT 42 at T11, as shown in FIG. 3J.

Likewise with respect to the block at address 5, when processor 30 copies the contents of address location 5 of memory array 32 to disk 50 address location 5, it also copies the then current value of TAG 60 to the corresponding DISK TAG field associated with the copied block, which is still 1.

In accordance with the present invention, as host 20 continues to read and modify the data in memory array 32, rather than having memory array 32 keep the only valid copy of the new data, drive 24 will continuously migrate the data onto disk 50. In other words, during the ordinary operations of drive 24 and while drive 24 is still in a WRITE ENABLE mode, unique data is continuously saved to disk 50 due to the fact that DVT 42 keeps processor 30 constantly informed of any differences between the contents of memory array 32 and disk 50. Drive 24 continuously works toward the elimination of those differences by saving the unique memory array 32 data back to the disk 50. Advantageously, drive 24 does not wait until it is transitioned into a WRITE PROTECT mode in order to perform this save function.

This constant updating of the disk 50 has a number of advantages. On such advantage is that in the event of a planned shut down of drive 24 or an unplanned loss of primary power to drive 24, it is likely that a significant percentage of data that is in memory array 32 is already on disk 50. Therefore, it would take less time to save the remaining unique data in memory array 32 to disk 50, after the shut down or loss of primary power. Another advantage is that in the event that data stored in memory array 32 is corrupted, due to some type of memory element failure, that same data may have already been saved on disk 50. If there is such a redundant copy of data on disk 50, then it is possible for processor 30 to restore the uncorrupted version of the data on disk 50 back to memory array 32.

Finally, in connection with the discussion of the modification of data by host 20, the example provided above was based on the assumption that host 20 modified the data after disk 50 had fully restored memory array 32. Understanding that in the preferred embodiment, processor 30 may place drive 24 into a WRITE ENABLE mode before memory array 32 is fully restored, it is therefore possible for host 20 to modify one or more blocks of data in memory array even before all of the other blocks are restored from disk 50. Drive 24 is nonetheless adapted for the occurrence of such data modifications, as processor 30 can scan DVT 42 at the same time that it is in the process of restoring memory array 32. Thereby, drive 24 switches between restoring unrestored data from disk 50 to memory array 32, and saving modified data from memory array 32 to disk 50.

E. Primary Power Failure

A further advantage of drive 24 is that it is designed to improve the protection of stored data in the event of a loss of primary power, meaning that drive 24 looses power from its principle power source, such as a 120 v AC wall outlet, for example. To show the data protection capabilities of drive 24, reference is now made to FIGS. 2K and 3K.

In connection with this explanation, it will be assumed that during the course of the processing operations of host 20, the data in the address locations 1, 3, 4, and 6 of memory array 32 is modified. The modified data, represented as DATA#, is transmitted to those same address locations in memory array 32 by T11, shown in FIG. 2K. Consequently, at the corresponding address locations of DVT 42, shown on FIG. 3K, the bits are set to 0, indicating that the contents of disk 50 at those addresses is not identical to the corresponding addresses of memory array 32.

As discussed above, processor 30 constantly scans the contents of DVT 42 to determine which blocks of data need to be copied from memory array 32 back to disk 50. In keeping with this example, during time segment T12, shown on FIGS. 2L and 3L, it will be assumed that the contents of memory array 32 at address location 1 have been saved to disk 50, in the same manner discussed above. Therefore, in time segment T12 processor 30 has updated DVT 42 in address location 1, shown on FIG. 3L, indicating that the contents of memory array 32 at address location 1 is the same as the contents of disk 50 at address location 1.

After saving the contents of address location 1, processor 30 continues to scan DVT 42 to determine what other memory array 32 address locations may need to be saved to disk 50, which as of T12 are address locations 3, 4, and 6.

Continuing with this example of the operation of drive 24, at time segment T12 it will be assumed that the primary power supply to disk 50 has been cut off, due, for example, to a power black out. Given that drive 24 is also supported by auxiliary power 70, shown in FIG. 1, when primary power is lost, drive 24 will be powered by auxiliary power 70.

Having lost its primary power, and understanding that it is possible that the redundant power source, namely auxiliary power 70, may be lost at any time, drive 24 next takes measures to protect its unique data stored in volatile memory array 32, and tables memory 34. In order to protect the data, processor 30 immediately forces drive 24 to exit the WRITE ENABLE mode and enter a WRITE PROTECT mode, preventing host 20 from continued write access to drive 24, although read access does continue. As a result of drive 24 exiting the WRITE ENABLE mode and entering the WRITE PROTECT mode, processor 30 will automatically increment TAG 60 by 1. Such incrementation occurs whenever drive 24 is placed in a WRITE PROTECT mode. Referring to FIG. 3M, it can be seen that as of T13 TAG 60 value is increased by 1 to 2.

Also seen by referring to FIG. 2M, as an additional aspect of the securing of drive 24 data, during T13 processor 30 will immediately save the contents of DVT 42 into SBT1nv 52, which is shown in FIG. 3M. Therefore, as of at least T13 drive 24 has a copy of volatile DVT 42 in non-volatile SBT1nv 52. After saving the contents of DVT 42 into SBT1nv 52, processor 30 sets the TABLES VALID 62 bit to 1, indicating that the contents of at least one of the tables on disk 50 are valid. Furthermore, as a result of the fact that DVT 42 was saved by processor 30 into SBT1nv 52, during T13 processor 30 increments the value of CNTR 90 by 2, such that its value is 2. Further details on the use of SBT1nv 52 and SBT2nv 54, and the significance of the counter values is provided below.

Referring to FIG. 2M, all data blocks on disk 50 are the same as the blocks in memory array 32, except for the blocks at address locations 3, 4, and 6. To the extent that auxiliary power 70 is still powering drive 24, processor 30 next attempts to save the three blocks of memory array 32 that are not backed up to disk 50.

During time segment T14, shown in FIGS. 2N and 3N, processor 30 saves the contents of memory array 32 at address location 3 back to disk 50 address location 3. As discussed above, when processor 30 does so, it also copies the then current value of TAG 60 into the DISK TAGS field associated with the block at address location 3. Recall that during time segment T13, shown in FIG. 3M, TAG 60 was incremented to 2 as a result of drive 24 going into a WRITE PROTECT mode. Accordingly, the DISK TAG value stored with the data copied from memory array 32 address location 3 to disk 50 has the numerical value of 2, shown in FIG. 2N.

As indicated above, SBT1nv 52 and SBT2nv 54 are generally redundant copies of the same information. They will, however, virtually always be somewhat different due to the fact that they are copies of DVT 42 taken at different points in time, and DVT 42 typically changes over time as data is saved from memory array 32 to disk 50. After the failure of primary power and during the data protection mode, processor 30 periodically and alternately copies the then current contents of DVT 42 back to SBT1nv 52 first, then SBT2nv 54, then again to SBT1nv 52, then again to SBT2nv 54, and so on. By doing so, drive assures that, if at any given time there were a total power failure, there will necessarily be a relatively current, non-volatile copy of the table indicating which blocks in disk 50 are identical to the blocks in memory array 32 at the time of the total power failure.

In other drive 24 embodiments, only a single non volatile "Suspect Block Table" could be used. Such an approach is not as secure as using two tables, however, given that it is possible that a total power failure could occur just as DVT 42 was only partially saved into the single, non-volatile table, making it uncertain which portions of the saved table were accurate. Thus the alternating copying method enhances the reliability of drive 24.

Using this alternating copying method and continuing with the detailed explanation, during T15, shown on FIGS. 2O and 3O, processor 30 copies the contents of DVT 42 to SBT2nv 54. When processor 30 does so, it will increment CNTR 92 by 2, such that the counter has the number 3 in it as of T15. It can now be seen by comparing the values of CNTR 90 and CNTR 92 why it was necessary for processor 30 to initially set CNTR 92 to a value of 1. After that initial setting, all subsequent incrementations of CNTR 90 and CNTR 92 will continue the staggered relationship, where one of counters will always be one greater than the other. More importantly, the counter with the highest number will be the one with the most current table values. This will prove to be significant when the disk 50 restores memory array 32, in accordance with the description below.

Referring now to FIGS. 2P and 3P, during time segment T16 processor 30 saves the data in memory array 32 address location 4 back to the corresponding address location for disk 50. In FIG. 2P it can be seen that the data in memory array 32 address location 4 and disk 50 address location 4 are identical. Additionally, when the data is saved from address location 4 in memory array 32, processor will also save the then current value of TAG 60, which is 2 at T16, as shown in FIGS. 2P and 3P.

Referring to FIG. 3P, it can be seen that as of T16, processor 30 has reset the bit at address location 4 of DVT 42. This indicates that the block at memory array 32 address 4 is identical to the block at disk 50 address location 4. On the other hand, neither SBT1nv 52 nor SBT2nv 54 has been modified during T16, given that after the most recent change of DVT 42 processor has not yet saved DVT 42 onto disk 50.

In connection with this detailed explanation of the operation of drive 24, it will next be assumed that after supplying power for some period of time auxiliary power 70 fails. In other words, the back up batteries in drive 24 had only a limited amount of power to supply after the loss of primary power, and the batteries fail before all of the modified data in memory array 32 has been backed up to disk 50.

It should be noted at this point that if drive 24 were a solid state disk drive that did not keep track of and preserve the information relating to which unique blocks of data in memory array 32 have been saved to disk 50, and all power were lost, then drive 24 would not be able to determine what data in disk 50 is good after power is restored. In accordance with the present invention, however, when DVT 42 is saved onto disk 50, drive 50 has preserved the data relating to the blocks that have been saved so that, at the very worst, a partial restoration of the data may occur.

Referring next to FIGS. 2Q and 3Q, and continuing with the exemplary explanation, during time segment T17 it will be assumed that the auxiliary power 70, shown in FIG. 1, fails. Consequently, all of the data in the volatile memory cells of memory array 32 and tables memory 34 is lost. Consistent with the earlier description, the contents of these volatile memory locations are considered empty, and therefore FIGS. 2Q and 3Q include the "*" symbol. On the other hand, as a result of disk 50 being a non-volatile memory source, the data that was in disk 50 as of T16, shown in FIGS. 2P and 3P is preserved.

After the power failure of both primary power and auxiliary power 70, it will be assumed that the power to drive 24 is restored. For example, power at the power station may be resumed, or auxiliary power 70 may be replaced. As a result of the resumption of power, processor 30 commences an initialization of drive 24, the objective of which is the restoration of data into memory array 32 for use by host 20.

Unlike the initialization discussed above in connection with FIGS. 2A–2G and 3A–3G, in this instance not only does disk 50 contain data, but also SBT1nv 52, SBT2nv 54, TAG 60, and TABLE VALID 62 have stored values, as shown on FIG. 3Q. It may be recalled that the discussion in connection with FIGS. 2A–2G and 3A–3G was based on the assumption that SBT1nv 52, SBT2nv 54, TAG 60, and TABLE VALID 62 contained no information. This assumption was useful to explain how the values stored therein were actually generated. On the other hand, it should be understood that the initialization procedure which is to be discussed next is more representative of the actual initialization of drive 24 after power is turned off, than the initialization discussed in connection with FIGS. 2A–2G and 3A–3G.

Assuming that the power to drive 24 is resumed, processor 30 first places drive 24 in a WRITE PROTECT mode, assuring that host 20 does not have write access to drive 24. Drive 24 will remain in the WRITE PROTECT mode until at least some, and possibly all, of memory array 32 is restored, as discussed above.

Now referring to FIGS. 2R and 3R, an illustration is provided to show the contents of memory array 32, tables memory 34, and disk 50 as of T18, which is a time segment shortly after the restoration of power. In FIG. 3R it can be seen that processor 30 has initialized AVT 40 and DVT 42, such that the bit settings of each table are binary 0. Additionally, it should be noted that during the table restoration and suspect block restoration that is next undertaken by drive 24, it remains in the OFF LINE mode, so that host 20 can neither read nor write to drive 24.

As yet another initial procedure, processor 30 examines the contents of TABLE VALID 62 to determine if at least one of either SBT1nv 52 or SBT2nv 54 is valid. Given that the TABLE VALID 62 bit is set to 1, as shown in FIG. 3R, processor concludes that at least one of the two tables contain valid information.

Processor 30 will next copy SBT1nv 52 or SBT2nv 54 into SBTv 44, depending upon which one contains the most current version of DVT 42 before total power was lost. In order to determine which is the most current version, processor 30 scans their respective counter values. Referring to FIG. 3R, as of T18 it can be seen that SBT2nv 54 is more current having the higher counter value, namely a value of 3. Accordingly, as of T18 the contents of SBT2nv 54 are copied into SBTv 44.

As of T18, SBTv 44 now contains a table indicating which blocks of data on disk 50 are "suspect". For purposes of this detailed explanation, the term "suspect" means that the data contained on disk 50, as of the time that memory array 32 is being restored, may or may not be identical to the data that was in the corresponding address of memory array 32 as of the time that total power to drive 24 was lost. In other words, the suspect designation, which is a 0 bit in SBTv 44, indicates that the data at the address location may or may not be valid. In order to actually determine if it is or it isn't, processor 30 must inquire further, by checking the TAG values associated with the data.

In the preferred embodiment, drive 24 will process the suspect blocks of data, and either restore them or log a data error, before restoring the non suspect blocks of data. Accordingly, during T18 processor 30 scans the contents of SBTv 44 and determines that there are two blocks of data that are suspect, namely the block at address location 4 and the block at address location 6, both having 0's in their corresponding address locations in SBTv 44.

As indicated above, the fact that address location 4 of SBTv 44 has a 0 does not necessarily mean that the data on disk 50 at that address is invalid, but only that processor 30 must inquire further to determine if the data is valid or invalid. In order to make that determination, processor 30 examines the DISK TAG associated with the block of data.

Still referring to FIGS. 2R and 3R it can be seen that the value of TAG 60 as of T18 is 2. In order to determine if the suspect data at disk 50 address location 4 is valid or invalid, processor 30 compares the DISK TAG value of the data, which is 2, to the then current value of TAG 60, which is also 2. If the DISK TAG value of the data is less than the value of TAG 60, processor 30 concludes that the data is in fact invalid. On the other hand, if the DISK TAG value is equal to the TAG 60 value, processor 30 concludes that the data in disk 50 at address location 4 is valid. Thus, in this particular example, processor 30 determines that the DISK TAG value of the data at address location 4 is equal to TAG 60, and thus concludes that this originally suspect data is in fact valid.

Having determined that the suspect data at address location 4 is in fact valid, processor 30 will then restore that suspect data to memory array 32. Referring now to FIGS. 2S and 3S, as of T19 processor has restored the data at disk 50 address location 4 to the corresponding memory array 32 address location. Additionally, with that data restored, and there being identity between disk 50 and memory array 32 at this particular address location, processor 30 has also set the corresponding bits in AVT 40 and DVT 42.

Having dealt with the first of the two suspect blocks, processor 30 next treats the second suspect block, namely the one at address location 6. In connection with the block of data at disk address location 6, it will be recalled that this block was never updated with the modified DATA# from memory array 32, before total power was lost at approximately T16 and T17. Therefore, the data in address location 6 is actually invalid.

As with the processing of block 4, processor 30 again examines the value of the DISK TAG associated with the data, and compares it to the value of TAG 60. Referring to FIG. 2S, processor 30 detects that the DISK TAG associated with the data at disk 50 address location 6 has a value of 1. Also referring to FIG. 3S TAG 60 has a value of 2 at T19. Recalling that if the DISK TAG associated with the data stored in disk 50 is less than the TAG 60 at the time of restoration, processor 30 will determine that the data is invalid. In this particular instance, processor 30 does determine that the data at address location 6 is invalid, given that the DISK TAG associated with the data is 1, while TAG 60 at the time of the comparison is 2. In fact, the determination that the data is invalid is correct, given that the data which had been modified by host 20 and stored in memory array 32 had never been restored to disk 50 before complete power to drive 24 was lost.

In accordance with the present invention, processor 30 marks the data at address 6 as invalid, or in error, such that if host 20 were to ever later request that particular data it would be signaled that the data is erroneous, and therefore probably not useable. Depending upon the specifics of the implementation, host 20 can then undertake to recreate that data, if possible.

Also, it can now be seen that even if only some of the data from memory array 32 is copied to disk 50 after a loss of complete power, through the use of the tables, AVT 40, DVT 42, SBTv 44, SBT1nv 52, and SBT2nv 54, drive 24 can determine which data is valid and which is invalid. Depending on how much data was saved before total power to drive 24 is lost, at least a partial restoration may occur.

In the preferred embodiment, drive 24 remains in an OFF LINE mode all the time that it is in the process of restoring the table and the suspect blocks of data. After drive 24 has processed those suspect blocks, by either restoring them or signaling a data error, drive 24 transitions to the WRITE PROTECT mode, through which drive 24 is available for read access, but not write access. Also, at this time drive 24 undertakes the restoration of the remaining blocks of non suspect data.

The restoration of the non suspect data progresses in a similar manner as described above in connection with FIGS. 2A–2G. Generally speaking, processor 30 restores the blocks of data at a given disk 50 address to the corresponding memory array 32 address in a sequential manner. Accordingly, referring to FIGS. 2T and 3T it can be seen that at T20 the contents of disk 50 address location 0 has been restored to memory array address location 0. Additionally, the appropriate bit settings have been made in AVT 40 and DVT 42.

Given that the bit settings in SBTv 44 are all 1's, except for addresses 4 and 6 which have already been treated by processor 30, the restoration can continue in a sequential manner. On the other hand, as explained above, in particular implementations of drive 24, drive 24 can respond to out of sequence requests for data by host 20.

Finally with respect to FIG. 3T, it might be noted at this point that the data at address location 3 is not treated as "suspect", even though it was copied back to disk 50 after the primary power failure. This is due to the fact that at the time DVT 44 was saved into SBT2nv 54, the bit setting of DVT 44 at address location 3 had been changed to 1, which was not the case with respect to the bit setting of DVT 44 at address location 3 when it was saved in SBT1nv 52. On the other hand, given that SBT2nv 54 was determined to be the more current version of DVT 44 at the commencement of the restoration process, SBT2nv 54 had that more current setting in the table so that the data was not even considered suspect.

Moreover, it should also be noted that the comparison of the DISK TAG value, stored together with a given block of data, against the TAG 60 value only is done with respect to suspect block. Therefore, when non suspect blocks are restored, processor 30 does not undertake the tag comparison performed in connection with the suspect blocks.

F. State Diagram of Drive Operations

Figure 4:
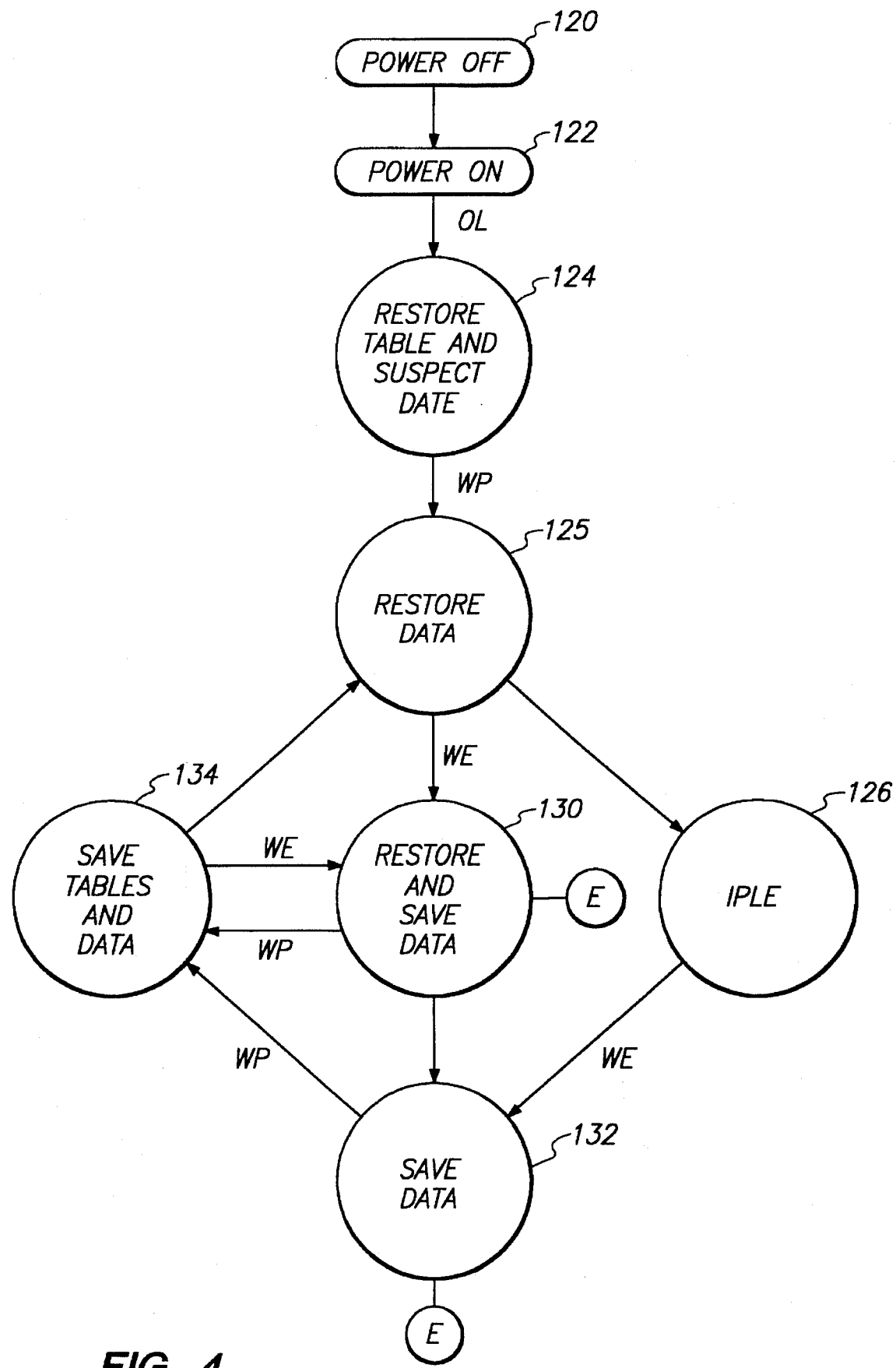
FIG. 4 is a state diagram illustrating the method of operation of the drive shown in FIG. 1, by reference to the various states in which the drive operates.

Referring now to FIG. 4, a state diagram is provided for further describing the method by which drive 24 operates. As indicated above, the initial description, presented in connection with FIGS. 2A–2G and 3A–3G, was uniquely designed to describe the origination of data; therefore, when drive 24 was turned on it was assumed that there was no data in any of the tables or fields on disk 50. The later discussion accompanying FIGS. 2K–2T and 3K–3T, was more representative of the actual operation of drive 24, insofar as in that discussion there were actually values in the tables on disk 50 when drive 24 totally lost power.

Accordingly, in connection with the discussion of the state diagram of FIG. 4 it will be assumed that where the diagram commences (i.e., in going from "Power Off" to "Power On"), there are stored values in the tables and fields on disk 50. In other words, before the power to drive 24 went off, values were stored for use in the tables and fields of drive 24, in the same manner as they were store for use in connection with the discussion of FIGS. 2Q–2T and 3Q–3T, above.

Now referring to FIG. 4, in the beginning of the state diagram the electric power to drive 24 goes from off state 120 to on state 122. Upon being turned on, drive 24 is placed in an OFF LINE mode by processor 30, and remains so until it is changed, as described herein. As shown, drive 24 then enters the "Restore Table and Suspect Data" state 124. Being in the OFF LINE mode, host 20 does not have read or write access to drive 24 during the time that the table and suspect blocks are being restored.

While drive 24 is in the Restore Table and Suspect Data state 124 processor 30 first examines the value of TABLE VALID 62 to determine whether the tables on disk 50 are valid. Recalling FIG. 3Q, for example, the bit setting of TABLE VALID 62 as of T17 is set to 1, indicating that DVT 42 was in fact copied back to disk 50 after the primary power was lost. Thus, the bit setting confirms that at least one of the tables on disk 50 is valid. Recalling that both SBT1nv 52 and SBT2nv 54 are copies of DVT 42, in state 124 processor 30 next determines which one of the two tables is the most current° In order to do so, processor 30 examines CNTR's 90 and 92 to determine which one is greater, since the higher value will indicate that it was the latest version of DVT 42 to be copied onto disk 50.

In the discussion of FIGS. 2Q and 3Q, the most current version of DVT 42 was saved in SBT2nv 54, which has CNTR 92 value of 3. Given that SBT1nv 52 has a counter value of 2, processor 30 thereby determines that of the two tables SBT2nv 54 is the most current. Having determined that the tables are valid, and which one of the two tables is the most current, processor 30 next copies SBT2nv 54 into SBTv 44, in the same manner as discussed in connection with FIGS. 2R and 3R, above.

While still in the Restore Table and Suspect Data state 124, processor 30 reviews DVTv 44 to find the suspect blocks and restore them to memory array 32 provided they are not in error. It will be recalled that in connection with FIGS. 2R, 2S, 3R, and 3S it was explained that the suspect block at address location 4 could be restored, but the suspect block at address location 6 was invalid and could not be restored. Thus, processor 30 would store an error message at address 6 indicating that the data is invalid, and host 20 would then have to deal with the error if it ever requests the data. Drive 24 will remain in state 124 until all of the suspect data is processed, by either being restored or having host 20 notified that some of the data is erroneous.

Referring back to FIG. 4, after all of the suspect data is restored, drive 24 then passes into the "Restore Data" state 125, which is the state in which drive 24 restores the non suspect data from disk 50 to memory array 32. As seen in FIG. 4, when drive 24 does so, it enters the WRITE PROTECT mode, so that host 20 can access drive 24 for read, but not write, operations. As discussed above in connection with FIGS. 2D–2G and 3D–3G, drive 24 is designed so that the WRITE PROTECT mode may be lifted before all of the data in disk 50 is restored to memory array 32.

On the other hand, even though the WRITE PROTECT mode may be lifted, it is also possible that processor 30 may fully restore the data on disk 50 to memory array 32 before drive 24 is shifted to a WRITE ENABLE mode. Accordingly, from state 125 drive 24 can proceed to one of two states; "Idle" state 126 or "Restore and Save Data" state 130.

Addressing first Idle state 126, if drive 24 is in the Restore Data state 125, and the WRITE PROTECT mode remains in effect, processor 30 will restore all of the data from disk 50 to memory array 32 and then pass into Idle state 126, in which there is effectively no work for drive 24 to process. In state 126, drive 24 remains idle, until it is WRITE ENABLED, which thereby forces it into "Save" state 132. The transition into the WRITE ENABLE mode would typically occur as a result of some of the original data in memory array 32 being modified by host 20, and then the modified data is returned to memory array 32.

Referring back to the branch from state 125, if the WRITE PROTECT mode is lifted and drive enters the WRITE ENABLE mode before all of the data on disk 50 is restored to memory array 32, then drive 24 passes into the "Restore and Save Data" state 130. In this state processor 30 continues to restore non-suspect data; however it will be recalled from the discussion of FIGS. 2H–2J and 3H–3J that in the WRITE ENABLE mode host 20 may modify the data in memory array 32. If such modification does occur, then in state 130 processor 30 saves that modified data back to disk 50, while processor 30 concurrently continues to restore any unrestored data on disk 50 to memory array 32.

From state 130 drive 24 may enter one of two states, Save Data state 132 and "Save Tables and Data" state 134. It will be recalled that Save Data state 132 also could have been entered from state 126, as indicated above. Whether state 132 is entered from state 126 or 130, in both instances all of the data in disk 50, namely the restorable suspect and non suspect data, has been fully restored to memory array 32. The function of drive 24 in state 132 is to continue to save to disk 50 the modified data that is stored in memory array 32 by host. During normal drive 24 operations, it can be expected that the significant majority of operations of drive 24 would be in state 132.

Still referring to FIG. 4, it can be seen that from states 130 or 132 drive 24 may be forced to exit the WRITE ENABLE mode and enter the WRITE PROTECT mode. As discussed, this may be due to the fact that primary power to drive 24 is lost and drive 24 must then attempt to protect the data stored in the volatile memory array 32. Accordingly, from either state 130 or 132, drive may enter "Save Tables and Data" state 134. In state 134, processor 30 first saves DVT 42 into whichever non-volatile table, namely SBT1nv 52 or SBT2nv 54, has the lowest counter value. When that occurs, the corresponding counter is incremented by 2. Likewise, with DVT 42 saved on disk 50, TABLE VALID 62 is set to 1 indicating that at least one of the tables is valid.

In state 134, processor 30 continues to save as much data from memory array 32 to disk 50 as the existing power will allow. While doing so, drive 24 will continue to save DVT 42, which is constantly being updated, to either SBT1nv 52 or SBT2nv 54 in the alternating manner discussed in connection with FIGS. 2N–2P and 3N–3P. As discussed above, it is possible that if drive 24 is operating on auxiliary power 70, that power may fail at any time. Once in state 134, drive 24 continues to save the tables and the modified data until it is done, or power totally fails.

As shown in FIG. 4, from state 134 drive 24 may transition back into the WRITE ENABLE mode, perhaps due to the primary power to the drive 24 being resumed. If that occurs, drive 24 transitions from state 134 back to state 130, which is the state in which any unrestored data is restored to memory array 32, and any modified data is saved to disk 50. From state 130 drive may transition into states 132 or 134, as detailed above.

FIG. 4 further shows that if all tables and modified data have been saved, power is still on, and drive 24 is still in the WRITE ENABLE mode, then drive 24 transitions to Restore Data state 125. It will be recalled that in state 125, processor restores any unrestored data on disk 50 to memory array 32. In the event that there is any such unrestored data, which would be determined by processor 30 from scanning the bit settings of AVT 40, processor 30 will restore that data in state 125. If, however, all such data has been restored, then drive 24 passes into the Idle state 126, and remains in that state until drive 24 is WRITE ENABLED.

Finally, in connection with FIG. 4 it should be understood that from each of the states shown on the diagram, except for states 130 and 132, drive 24 may enter the power off state 120. If it were to do so, drive 24 would simply remain in power off state 120 until power is resumed, and drive enters the power on state 122, shown in the diagram.

On the other hand, if drive 24 enters the power off state from state 130 or 132, occurring possibly when primary and auxiliary power are lost simultaneously, then drive 24 will enter an ERROR state, signifying that the data on drive 24 is unreliable. This is due to the fact that if all power fails when drive 24 is in either of these states, memory array 32 may contain the only valid copy of modified data. Moreover, if the power off state 120 is entered from either state 130 or 132, when the power is resumed disk 50 will not contain a saved copy of DVT 42 indicating which modified data was saved back to disk 50. Therefore, it is possible to distinguish between valid and invalid data on disk 50. As seen by referring to FIG. 4, no such table copying occurs until drive 24 enters Save Tables and Data state 134 from either state 130 or 132.

Accordingly, referring to FIG. 4, it should be understood that drive 24 may go from any one of the states, other than 130 and 132, to power off state 120. With respect to states 130 and 132, if total power is lost while drive is in either of these states, drive 24 will enter an ERROR mode, as indicated by the encircled "E" in FIG. 4.

In connection with this detailed description the discussion focused upon the processing of data in address locations ranging from 0–6. The discussion of such few addresses was in the interest of providing a straightforward explanation of the components and methods by which drive 24 protects and restores data. It will be understood by those skilled in the art, however, that the techniques and principles discussed herein can be implemented in solid state disk drives having virtually any number of address locations. Such solid state disk drives would operate in the same manner described herein.

Accordingly, the invention in its broader aspects is not limited to the specific details, representative apparatus, and illustrative examples shown and described herein. Thus, departures may be made from such details without departing from the spirit or scope of the invention.

What is claimed is:

1. A self contained, solid state disk drive data storage apparatus for storing and retrieving blocks of user data received from a host computer via an external bus and comprising:

a non-volatile memory comprising at least one disk drive for storing data blocks by logical block addresses and having a predetermined data storage capacity of at least 100 megabytes of user data;

volatile memory means for storing data blocks by logical block addresses transferred from corresponding logical block addresses of said non-volatile memory and having a predetermined data storage capacity approximately equal to the capacity of the non-volatile memory;

a processing means for transferring data between said non-volatile memory means and said volatile memory means via an internal bus structure, and first status means within said volatile memory means for indicating that data stored in said volatile memory means has been modified by said host computer after said data stored in said volatile memory was transferred from said non-volatile memory.

2. The apparatus as in claim 1, wherein said processing means polls said first status means and transfers data, which said first status means indicates has been modified, from said volatile memory means to said non-volatile memory.

3. The apparatus as in claim 2 comprising a plurality of operative states including a WRITE ENABLE state, and wherein said processing means transfers the modified data while said apparatus is in the WRITE ENABLE state.

4. The apparatus as in claim 1, comprising second status means within said non-volatile memory for indicating that data blocks stored in said non-volatile memory correspond to data blocks stored in said volatile memory means, said processing means for reading said second status means and for transfering data blocks from said non-volatile memory to said volatile memory means during a RESTORE DATA operative state of said apparatus following removal and restoration of a primary power supply in accordance with said second status means.

5. The apparatus as in claim 4 further comprising onboard auxiliary power supply means for temporarily powering said apparatus following removal of a primary power supply during a SAVE TABLES and DATA operative state during which the first status means is polled by the processing means and data blocks in the volatile memory means which have been changed by the host computer are written to the non-volatile memory, and the second status means is updated.

6. The apparatus as in claim 5 wherein said second status means comprises a plurality of tables, wherein a data block status entry to a first one of the tables is written by the processing means before a corresponding data block is written from the volatile memory means to the non-volatile memory, and wherein a data block status second entry is written to a second one of the plurality of the tables by the processing means following completion of writing of the corresponding data block, the processing means for determining correspondence between data block status entries for the corresponding data block before writing it back into the volatile memory means during a RESTORE DATA operative state.

7. The apparatus of claim 1, wherein the processing means scans the first status means to determine if any of the data blocks in said volatile memory means have been modified by the host computer, and for transferring a copy of the modified data blocks into said non-volatile memory.

8. The apparatus as in claim 7, wherein said processing means causes transfer of a copy of the modified data blocks from the volatile memory means to the non-volatile memory while said apparatus is in a WRITE ENABLE mode.

9. The apparatus as in claim 7, wherein said volatile memory means includes an address, at which data is stored, and said indicating means includes a corresponding address, at which data is stored, whereby the data stored in said address of said first status means indicates whether data stored in the corresponding address of said memory means has been modified.

10. The apparatus as in claim 9, wherein current values of said first status means are saved in a second status means within said non-volatile memory when said apparatus exits a WRITE ENABLE operative mode.

11. The apparatus as in claim 7, wherein said volatile memory means includes an electronic dynamic random access memory (DRAM) array.

12. A self-contained, solid state disk data storage apparatus for storing data block received from a host computer comprising:

an electromechanical recording and playback device having a multiplicity of logical block addresses, there being a logical block address at which each data block is stored;

a dynamic random access memory array having an access time to a data block shorter than an access time of the electromechanical recording and playback device and having a multiplicity of logical block addresses, there being a logical block address at which each data block is stored, logical block addresses of the dynamic random access memory array for a particular data block corresponding to logical block addresses for the particular data block stored within the electromechanical recording and playback device;

a memory including a data structure table having a logical block address which corresponds to the logical block addresses of said electromechanical recording and playback device and the dynamic random access memory array for each data block, the table for storing data which indicates that data stored in said dynamic random access memory array has been modified after it was transferred from said electromechanical recording and playback device; and processing means for scanning said data structure table to determine if any of the data blocks in said dynamic random access memory array has been modified by the host computer, and for saving a copy of modified data blocks in said electromechanical recording and playback device while said apparatus is in a WRITE ENABLE mode.

13. The apparatus as in claim 12, wherein said memory including said data structure table is included in said dynamic random access memory array.

14. The apparatus as in claim 13, wherein a current copy of said data structure table is saved in said electromechanical recording and playback device when said apparatus exits a WRITE ENABLE mode.

15. The apparatus as in claim 14, further comprising means for indicating whether the copy of said data structure table is valid when the copy is saved in said electromechanical recording and playback device.

16. The apparatus as in claim 12, wherein said said data structure table includes data which indicates which modified data blocks in said dynamic random access memory array have been saved in said electromechanical recording and playback device after said apparatus exits a WRITE ENABLE mode.

17. The apparatus as in claim 12, wherein data saved in the electromechanical recording and playback device further includes a TAG value stored with the data.

18. The apparatus as in claim 17, wherein said processing means uses said stored TAG value to determine whether data stored in said electromechanical recording and playback device is valid.

19. The apparatus as in claim 17, wherein said electromechanical recording and playback device stores a TAG field, the value of which changes each time said apparatus exits a WRITE ENABLE mode, and the TAG value stored with the data is equal to the value of the TAG field at the time that the data is saved.

20. The apparatus as in claim 12 further comprising onboard auxiliary power supply means for temporarily supplying power to the self-contained, solid state disk data storage apparatus when a primary power outage occurs at the host computer supplying power to the data storage apparatus in order to enable the processing means to continue to scan said data structure table to determine if any of the data blocks in said dynamic random access memory array has been modified by the host computer, and to save a copy of said data structure table and any unsaved modified data blocks in said electromechanical recording and playback device, until primary power is restored to the host computer.

21. A method of storing data in a solid state disk data storage apparatus comprising the steps of:

transferring data blocks from a disk drive non-volatile memory means to a solid state volatile memory means within the storage apparatus at a first, relatively slow disk drive transfer rate;

transferring data blocks between a host computing system and the solid state volatile memory means at a second, relatively fast solid state volatile memory data transfer rate;

monitoring the modification of the data blocks in the solid state volatile memory means after the data blocks were transferred to the solid state volatile memory means; and saving any modified data blocks in the disk drive non-volatile memory means.

22. The method as in claim 21 further comprising the step of:

storing status data in a data block status indicating means, the stored status data indicating which data blocks in said solid state volatile memory means have been modified.

23. The method as in claim 22, further comprising the step of:

scanning the data block status indicating means, and performing said saving step while the solid state disk data storage apparatus is in a WRITE ENABLE mode.

24. The method as in claim 22, further comprising the step of:

changing the data in the data block status indicating means depending upon whether modified data blocks have been saved in the solid state volatile memory means.

25. The method as in claim 22, further comprising the step of:

saving the data block status indicating means in the disk drive non volatile memory means.

26. The method as in claim 25, wherein said step of saving the data block status indicating means occurs when the solid state disk storage apparatus exits a WRITE ENABLE mode.

27. The method as in claim 21, wherein the step of saving any modified data blocks in the disk drive non-volatile memory means further comprises the step of:

storing a TAG value along with each saved modified data block, and using the TAG value to determine if the saved data block is valid.

* * * * *